United States Patent [19]

Koga et al.

[11] Patent Number: 5,581,796
[45] Date of Patent: Dec. 3, 1996

[54] PROCESSING METHOD AND GRAPHICS PROCESSOR FOR SKIP DRAWING A FIGURE

[75] Inventors: Kazuyoshi Koga; Ryo Fujita, both of Hitachi; Koyo Katsura, Hitachiota; Yasushi Fukunaga; Hideyuki Hara, both of Hitachi, all of Japan

[73] Assignee: Hitachi, Ltd., Tokyo, Japan

[21] Appl. No.: 164,776

[22] Filed: Dec. 10, 1993

Related U.S. Application Data

[63] Continuation of Ser. No. 489,107, Mar. 6, 1990, abandoned.

[30]   Foreign Application Priority Data

Mar. 17, 1989  [JP]  Japan ..................................... 1-52775
Mar. 17, 1989  [JP]  Japan ..................................... 1-63745

[51] Int. Cl.⁶ ..................................................... G06T 15/00
[52] U.S. Cl. ............................ 395/133; 395/134; 395/139
[58] Field of Search ..................................... 395/127, 128, 395/133–135, 139, 119–122, 141

[56]                 References Cited

U.S. PATENT DOCUMENTS 4,549,275  10/1985  Sukonick ................... 395/127 X
4,779,210  10/1988  Katsura et al. ................ 395/134
4,811,241   3/1989  Liang ......................... 395/134
4,878,183  10/1989  Ewart ......................... 395/128
4,982,345   1/1991  Callahan et al. ........... 395/134 X
5,031,114   7/1991  Yamagami .................... 395/134

FOREIGN PATENT DOCUMENTS 63-175982   7/1988  Japan .
63-228274   9/1988  Japan .
63-249269  10/1988  Japan .

*Primary Examiner*—Almis R. Jankus
*Attorney, Agent, or Firm*—Antonelli, Terry, Stout & Kraus

[57] ABSTRACT

In a case where a graphic image segment of which positional information is defined in a world coordinate system and of which size information is defined in a device coordinate system is developed to be displayed on a multi-window screen, the development processing performance is improved in peripheral portions of the window. A rectangular development area (first development area) associated with the window is expanded with consideration of a size information of a graphic segment so as to obtain a second development area. The second development area is compared with a rectangular area (an existence area) circumscribing a graphic image represented only with positional information of the graphic segment. As a result, whether or not the graphic segment is to be developed is determined. The first development area is reduced with consideration of size information of the graphic segment to produce a third development area. The third development area is compared with the existence area to decide whether or not the clipping operation is necessary for the graphic segment.

17 Claims, 16 Drawing Sheets

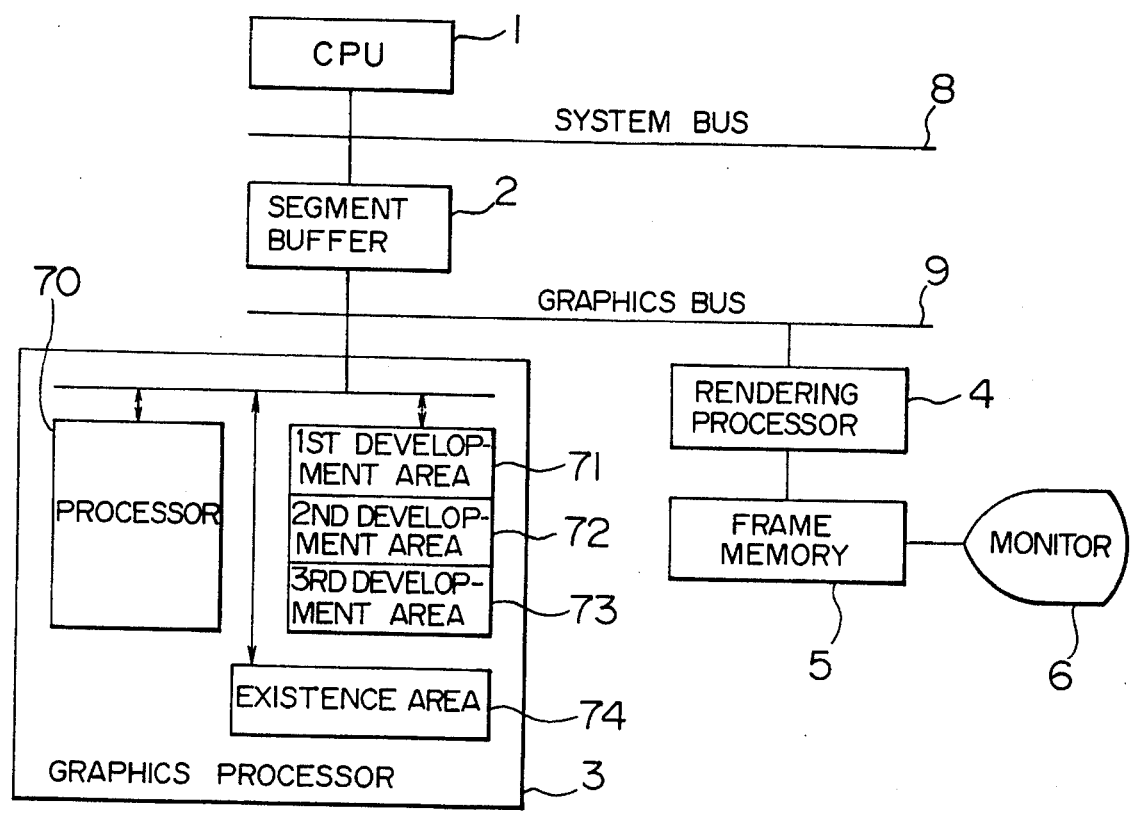

FIG. 7

| DEVELOPMENT AREA EXPANSION/REDUCTION QUANTITY | | DEVICE COORDINATES | d | |
|---|---|---|---|---|
| --- | | | | |
| 1ST DEVELOPMENT AREA | LOWER-LEFT x | WORLD COORDINATES | X10 | ⎫ |
| | LOWER-LEFT y | | Y10 | |
| | UPPER-RIGHT x | | X11 | 71 |
| | UPPER-RIGHT y | | Y11 | |
| --- | | | | |
| 1ST DEVELOPMENT AREA | LOWER-LEFT x | DEVICE COORDINATES | x10 | |
| | LOWER-LEFT y | | y10 | |
| | UPPER-RIGHT x | | x11 | |
| | UPPER-RIGHT y | | y11 | ⎭ |
| --- | | | | |
| 2ND DEVELOPMENT AREA | LOWER-LEFT x | WORLD COORDINATES | X20 | ⎫ |
| | LOWER-LEFT y | | Y20 | 72 |
| | UPPER-RIGHT x | | X21 | |
| | UPPER-RIGHT y | | Y21 | |
| --- | | | | |
| 2ND DEVELOPMENT AREA | LOWER-LEFT x | DEVICE COORDINATES | x20 | |
| | LOWER-LEFT y | | y20 | |
| | UPPER-RIGHT x | | x21 | |
| | UPPER-RIGHT y | | y21 | ⎭ |
| --- | | | | |
| 3RD DEVELOPMENT AREA | LOWER-LEFT x | WORLD COORDINATES | X30 | ⎫ |
| | LOWER-LEFT y | | Y30 | 73 |
| | UPPER-RIGHT x | | X31 | |
| | UPPER-RIGHT y | | Y31 | |
| --- | | | | |
| 3RD DEVELOPMENT AREA | LOWER-LEFT x | DEVICE COORDINATES | x30 | |
| | LOWER-LEFT y | | y30 | |
| | UPPER-RIGHT x | | x31 | |
| | UPPER-RIGHT y | | y31 | ⎭ |
| --- | | | | |
| --- | | | | |

F I G. 11
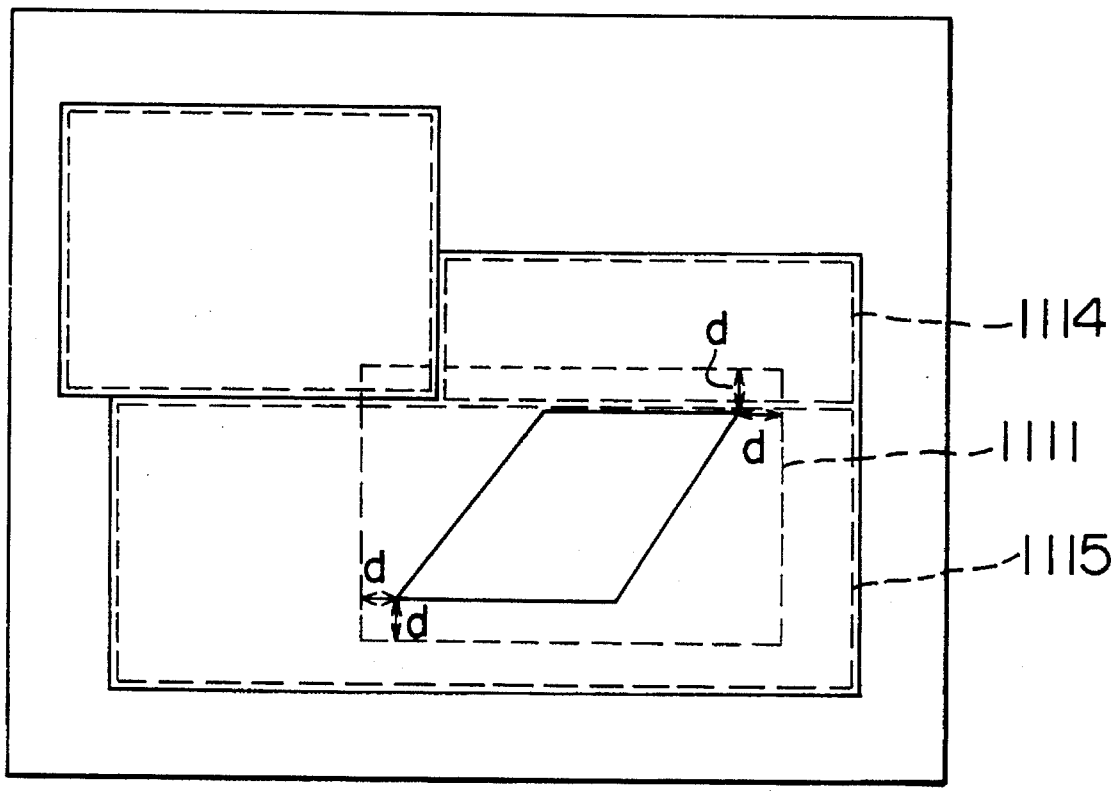

PROCESSING METHOD AND GRAPHICS PROCESSOR FOR SKIP DRAWING A FIGURE

This application is a continuation of application Ser. No. 07/489,107, filed on Mar. 5, 1990, now abandoned.

BACKGROUND OF THE INVENTION

The present invention relates to a graphics processor, and in particular, to a graphics processor in which a graphics drawing processing performance is improved in the neighborhood of a boundary of a drawing region.

As described in pages 375 to 381 of the "Fundamentals of Interactive Computer Graphics" Foley Addisson Wesley (1982), when data of a display list described as codes representing graphic images is to be drawn using a graphics processor, a mechanism to check the data of the display list is employed in many cases such that graphic images not overflowing development areas or regions specified as drawing areas or domains are to be developed and graphic images beyond the specified development areas are not to be developed. With this provision, unnecessary drawing operations can be avoided, which hence efficiently increases the drawing speed. In this operation, for each of a plurality of drawing graphic image units (segment units), a minimum rectangular range circumscribing the segment is required to be computed. Subsequently, the rectangular range (called an existence area) is first compared with the associated development area such that when the existence area is explicitly beyond the development area, the system skips the drawing operation for the segment. As described above, the drawing processing need not be accomplished for all segments described in the display list. This procedure is especially effective when the development area is smaller than the overall graphic image constituted with all drawing segments contained in the display list.

In the processing described above, the development and existence areas for the area comparison are generally defined with independent world coordinates with respect to coordinates associated with the output devices, such as a CRT, so as to minimize the number of area computations.

The prior art technology is efficient when the drawing graphic images are defined only on the world coordinate system. However, in the conventional technology, considerations have not been given to a graphic image defined by use of two kinds of coordinate systems, including the world coordinate system and a device coordinate system (depending on an output device such as a CRT). These kinds of graphic images include bold-line images and marker images. For example, for a bold-line image, the world coordinates are used to define positions where bold lines are to be drawn and start and end points of direct lines as centers of the respective bold lines; whereas, the device coordinates are employed to define line widths thereof. For such graphics, the comparison between the existence area and the development area described above cannot be achieved. Namely, each segment is required to be first developed. In consequence, in a case where most drawing segments of the graphic images are defined by both the world and device coordinates, there arises a problem that the virtual drawing speed is lowered.

On the other hand, when displaying a graphic image in a window (development area) opened on a screen, if the image overflows the window, it is necessary not to display an overflowed portion. In accordance with the conventional clipping method, based on a boundary line of the window, a portion of the display image inside the window is determined so as to display only the determined portion in the screen, namely, the other portions are prevented from being displayed.

Japanese Patent Applications, JP-A-59-117661 and JP-A-62-69372 are related to the conventional clipping technology.

For example, as shown in FIG. 13A, let us assume that a bold line 107 is to be displayed in a window (development region) B on a screen A. In an ordinary case, on both sides of a line 101 defined as a base in the world coordinate system, auxiliary lines 102 and 103 are computed in the device coordinate system to attain bit data thereof, thereby drawing the data to expand the line width. (In FIG. 13A, for simplicity of explanation, gaps are shown between the lines 101 and 102 and between the lines 102 and 103; however, these gaps are not actually visible, namely, a bold line 107 is visually recognized.) In addition, for example, when displaying a marker 104, a command to display a marker is inputted to the system and only a center point 105 is specified with world coordinates. As a result, a graphic image (X in this example) of a marker shown in FIG. 13A is displayed on the screen.

As described above, in a case where a marker and bold line are being displayed in the window B, when another window (development area) C is opened as shown in FIG. 13B, if respective portions of the marker 104 and the bold line 107 not concealed by the window C are not displayed, an unnatural feeling is conceived by the operator. However, in the case shown in FIG. 13B, since the center point 5 of the marker 104 defined with the world coordinates is within the window C, the marker is judged in the conventional clipping operation to be beyond the development area (a portion of the window B not concealed by the window C in the case of FIG. 13B) and is hence not displayed at all. That is, the display of FIG. 13B where a portion is displayed is not obtained, namely, the graphic image is entirely removed. In addition, in the case of the bold line 107, when the overall image of the center line 101 defined with the world coordinates is concealed by the development area C, the computations of the auxiliary lines 102 and 103 are not carried out such that even in a case where a portion of the auxiliary line 102 is within the drawing domain of the window B as shown here, the auxiliary line 102 is not displayed.

In order to remove the disadvantage above, according to the prior art technology, a range where the marker exists (a range including the overall image of X in the case above) is computed to determine whether or not the range is within the development area. Moreover, in the case of the bold line, the same check is also achieved for the auxiliary lines so as to execute processing such that items within the development range are displayed, thereby implementing an algorithm which does not give an unnatural feeling to the operator visually checking images on the screen. However, the processing of this kind is attended with a problem that the processing time is elongated and hence the drawing performance is considerably lowered.

SUMMARY OF THE INVENTION

It is therefore an object of the present invention to provide a graphics processor in which the graphics drawing processing performance is improved in the neighborhood of a boundary of a drawing region.

Another object of the present invention is to provide a graphics processor in which a high-speed drawing operation is accomplished also for a graphic image defined with both of the world and device coordinates.

Still another object of the present invention is to provide a graphics processor in which a high-speed clipping operation is carried out in the neighborhood of a boundary of a drawing region without producing an unnatural image display.

In order to achieve the objects above, according to one aspect of the present invention, when a region comparison is conducted for the segments of graphic images defined with the world and device coordinates, a development area (a first development area) undergoes a coordinate transformation based on a quantity (represented as $2d$) of the size of a graphic image defined with the device coordinates so as to create a second development area by expanding the first development area by a predetermined range, thereby comparing the obtained development area with an existence area of the segment. Based on the comparison result, the system determines whether or not the development processing is necessary.

Furthermore, in accordance with another aspect of the present invention, the first development area is reduced by a predetermined range so as to attain a third development area. Subsequently, for the segment for which the drawing is determined to be necessary through the comparison with the second development area, the existence area of the graphic segment is compared with the third development area. If the existence area is included in the third development area, the development processing is accomplished without executing the clipping operation; otherwise, the development processing is conducted with the clipping operation.

Moreover, according to another aspect of the present invention, the existence area of the graphic image is expanded by a predetermined range in consideration of a quantity defined with device coordinates so as to generate a second existence area. Thereafter, the second existence area is compared with the first development area to determine the necessity of the drawing processing and the clipping processing.

In a case where a graphic segment unit is defined with two kinds of coordinates, positional information items thereof are ordinarily defined with world coordinates and graphic size information items are defined with device coordinates.

In this situation, a second development area is defined as follows. A magnitude defined with device coordinates is reduced to the first development area, so that a first development area is expanded by the magnitude to obtain the second development area defined with world coordinates.

Consequently, for each graphic image, the area comparison is conducted with the second development area only depending on the world coordinates representing the positional information such that if there does not exist any area intersecting the second development area, also for a graphic image having a magnitude or size defined with device coordinates, the development operation into the development area need not be carried out.

As described above, by additionally setting the second development area, the area comparison can be conducted also for a graphic image defined with the world and device coordinates.

Naturally, there exists a method in which for each graphic segment, an existence area is defined also with consideration of a size designated with device coordinates. This method may also be employed to correctly achieve the area comparison.

In addition, according to the present invention, a clipping judge region in which necessity of the drawing is judged is greater than an actual drawing area such that of the image data judged to be drawn, image data not included in the drawing area is prevented from being stored in a frame memory or that even when the image data is stored in the memory, the data is prevented from being actually displayed, thereby accomplishing a high-speed processing. Moreover, since an image at a boundary of the drawing area has continuity with the image which is outside the drawing area and which is hence not displayed, an unnatural image display can be avoided.

BRIEF DESCRIPTION OF THE DRAWINGS

These and other objects and advantages of the present invention will become apparent by reference to the following description and accompanying drawings wherein:

FIG. 1 is a schematic system configuration diagram showing a first embodiment in accordance with the present invention;

FIG. 2 is a diagram schematically showing an example of a display list in a segment buffer 2 of FIG. 1;

FIG. 7 is a diagram schematically showing a mapping layout of the respective development areas in a graphics processor 2 of FIG. 1;

FIG. 11 is an explanatory diagram useful to explain a comparison between a second existence area and a first development area in a second embodiment according to the present invention;

DESCRIPTION OF THE PREFERRED EMBODIMENTS

Figure 3A:
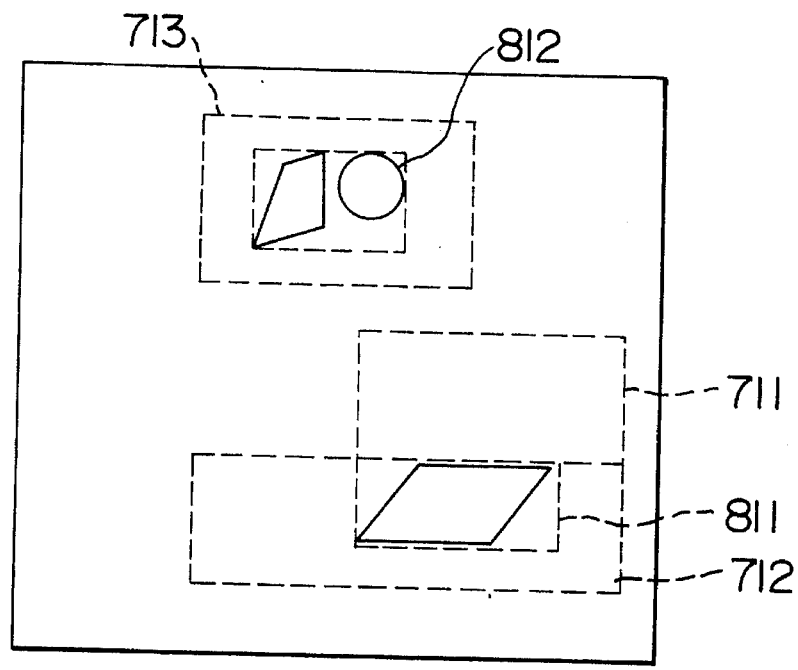
FIG. 3A is a diagram useful to explain a definition with world coordinates in a multi-window display example.

Referring now to FIGS. 1 to 9, a description will be given of a first embodiment according to the present invention.

First, an outline of the system configuration of a workstation will be described with reference to FIG. 1. In this constitution, a CPU 1 writes a graphic drawing command in a segment buffer 2 and then initiates operation of a graphics processor 3. At the initiation of operations, a plurality of rectangular development areas are specified in association with the number of windows. The graphic drawing commands here include a primitive graphic command for defining positions with world coordinates, an attribute command for denoting such items as color, a width, pattern for a drawing operation, a segment control command for controlling a set of graphic images, and a coordinate transform command for designating a transformation coefficient to be used when world coordinates are transformed into device coordinates. FIG. 2 shows an example of the commands. (Details about FIG. 2 will be described in conjunction with FIG. 3.)

The graphics processor 3 carries out an area comparison for each specified development area to decide whether or not the pertinent graphic image can be developed in the development area. If it is found that the development is is be carried out as a result of the comparison, the processor 3 transforms the data from the world coordinate system into the device coordinate system. Furthermore, for a graphic image which at least partially overlaps the inside and the outside of the development area, a clipping operation is carried out to develop only a graphic image portion contained in the development area, thereby supplying a rendering processor 4 with coordinates of the device coordinate system to indicate a reference point. For example, in the case of a bold line having a line width equivalent to three lines, the graphics processor 3 sequentially passes to the rendering processor 4 a start point and an end point of each of three direct lines in a line-by-line fashion.

On receiving the data from the graphics processor 3, the rendering processor 4 interpolates the reference point and then loads the data to be displayed on a monitor 6 in a frame memory 5, which keeps the data in a bit map configuration.

Figure 3B:
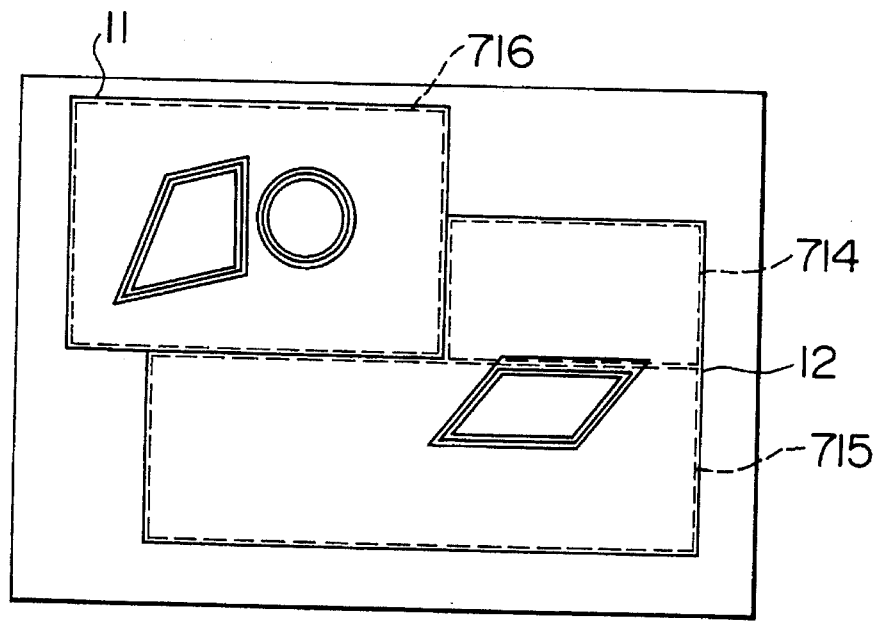
FIG. 3B is a diagram for explaining an operation to develop a graphic image onto device coordinates in a multi-window display example.

Referring next to FIGS. 3 to 5, a specific example of the development will be described in an illustrative manner. FIG. 3B shows a state in which data is developed onto the device coordinate system. Over a window 12, a window 11 overlaps with an upperleft portion of the window 12. Since the window 11 here is at the upper-most position, a first development area (DC) 716 thereof represented in the device coordinate system is configured as a rectangle. Furthermore, the window 12 includes a first development area (DC) 714 and a first development area (DC) 715 in the device coordinate system. FIG. 3A shows a definition in the world coordinate system associated with the device coordinates of FIG. 3B, namely, a graphics definition in the segment buffer 2. For the graphic image, positional information items are designated with world coordinates, whereas width items are denoted with magnitude values (widths of three lines) as attribute information in the device coordinate system. By the way, the developing position of the image in the device coordinate system depends on the coordinate transform coefficients adopted in the transformation from the world coordinates (WC) into the device coordinates (DC); consequently, the positional relationships are different from each other.

Furthermore, FIG. 2 briefly shows a display list in the segment buffer 2 of this specific example. Defining several graphic images as a segment, coordinate transform coefficients are defined by "SET-MATRIX". For the contents of the display list, the development areas 714, 715, and 716 are used to achieve development processing three times. In this processing, first, when initiating the execution of an instruction from the CPU, an existence area associated with information of "SEGMENT-START" is compared with the development area such that the development processing is carried out only for a set (segment) including graphic images within the development area. When the existence area is clearly separated from the development area, namely, when there does not occur any overlapping therebetween, the development processing is skipped for the segment.

Incidentally, comparing the first development area (WC) 711 shown in FIG. 3A with the existence areas of the respective segments, it is found that neither one of these segments exists in the first development area (WC) 711 and hence the development is skipped for these segments. However, as shown in FIG. 3B, a portion of a parallelogram is required to be drawn in first development area (DC) 714.

It is found that this situation takes place in a case where the line width X of the image cannot be defined with world coordinates and hence is defined in the device coordinate system. In consequence, in this kind of graphic image, the skip processing cannot be conducted depending on the area comparison, namely, it has been necessary to achieve the development processing in all development areas.

Figure 4A:
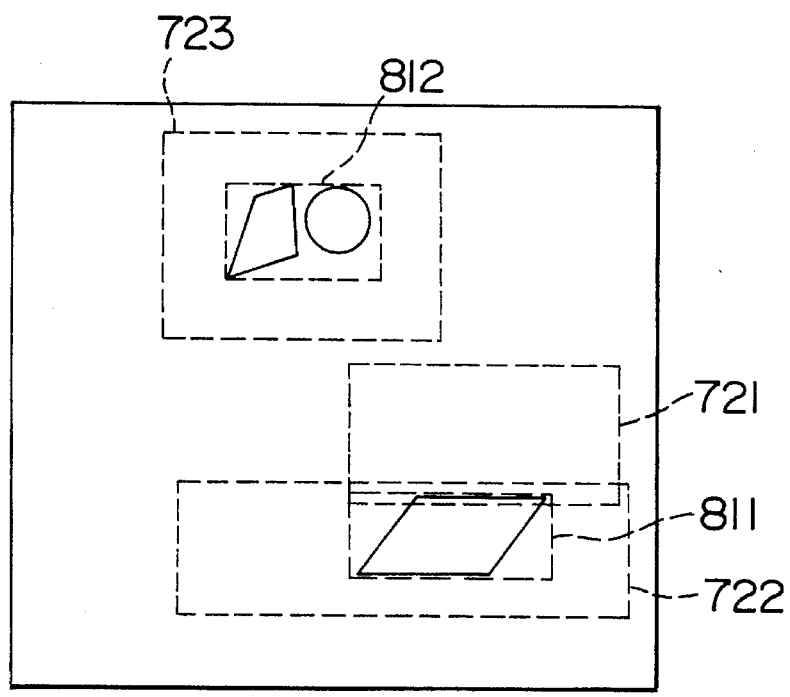
FIG. 4A is an explanatory diagram useful to explain a comparison between an existence area and a second development area in the world coordinate system.
Figure 4B:
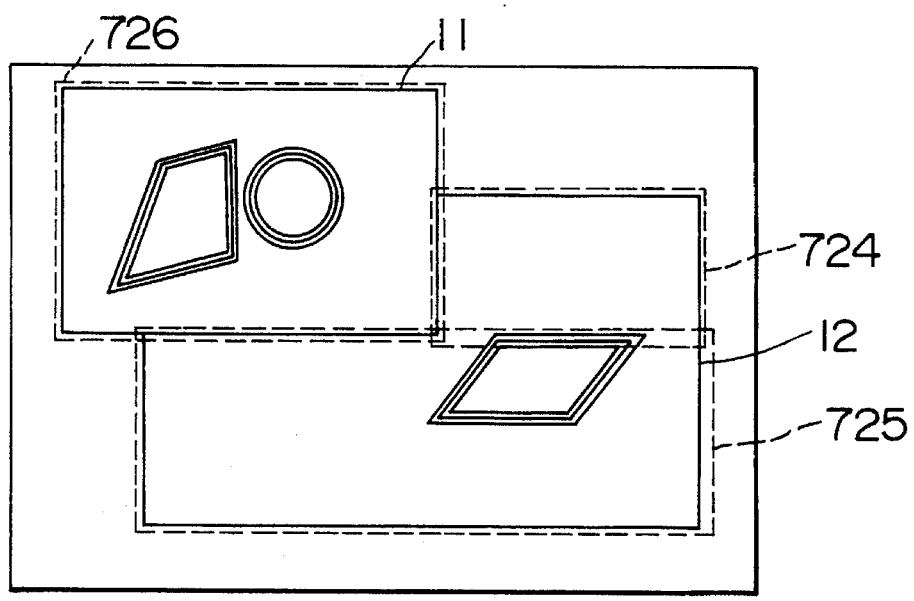
FIG. 4B is an explanatory diagram for explaining a comparison between an existence area and a second development area in the device coordinate system.

Let us here enlarge the development area by a magnitude (to be designated as d herebelow) indicating the size of the graphic image in the device coordinate system. Referring now to FIGS. 4A and 4B, a description will be given of the operation in association with the example shown in FIGS. 3A and 3B. The diagram of FIG. 4B is defined with device coordinates in which the first development area (DC) defined in FIG. 3B is increased by the line width d to generate a second development area (DC). The device coordinates of the second development area are transformed into world coordinates to compute and to define a second development area (WC). As shown in FIG. 4A, there are attained a second development area (WC) 721, a second development area (WC) 722, and a second development area (WC) 723. Particularly, the area (WC) 721 partially overlaps with the area (WC) 722.

By the way, the existence areas of the respective graphic images are identical to those of FIG. 3A. When the area comparison is accomplished in FIG. 4A, an existence area 811 of a parallelogram is included in the second development areas (WCs) 721 and 722. The area 811 however is outside the second development area (WC) 723. Consequently, the development processing is conducted in the areas 721 and 722, whereas the skip processing is achieved in other areas.

Under the conditions above, in the parallelogram drawing processing, the clipping operation is required to be executed in the development area. In the clipping operation, the clipping value is attained in the first development area (DC).

Figure 5A:
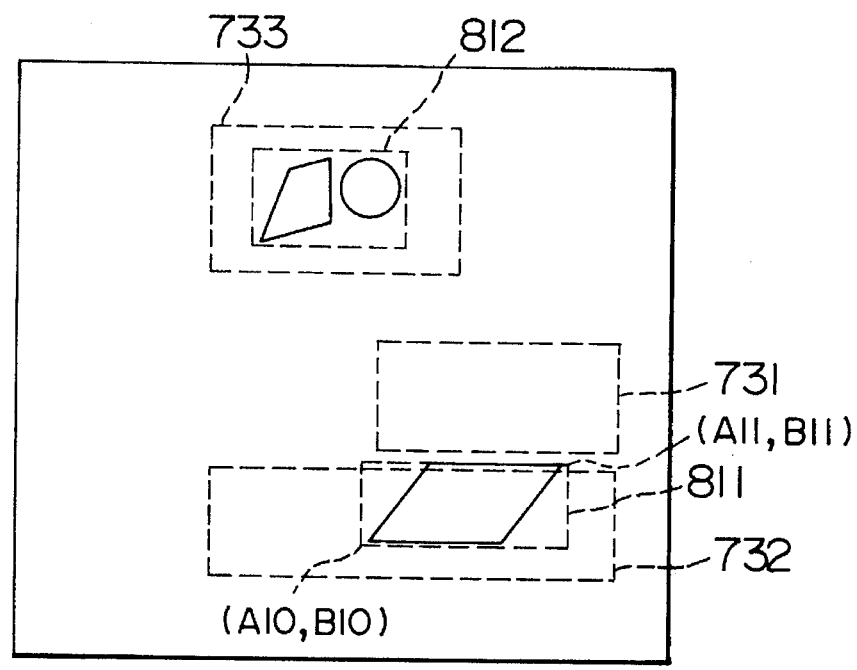
FIG. 5A is an explanatory diagram useful to explain a comparisons between an existence area and a third development area in the world coordinate system.
Figure 5B:
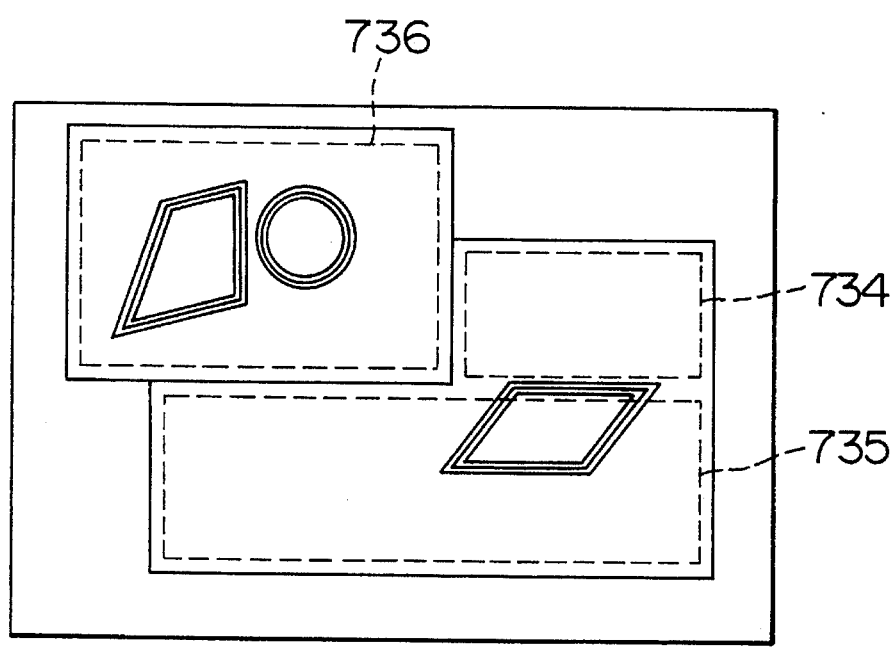
FIG. 5B is an explanatory diagram for explaining a comparison between an existence area and a third development area in the device coordinate system.

Furthermore, a third development area is established, which will be described with reference to FIGS. 5A and 5B. The second development areas have been generated by expanding the first development area by the magnitude d. The third development area is produced by reducing the first development area by d. Naturally, this processing is achieved for all development areas. An existence area 812 of a parallelogram and a circle shown in FIG. 5A is included in a third development area 733. In this case, it is easily understood that the clipping operation is unnecessary in the subsequent graphics and rendering processing. In addition, the existence area 811 of the parallelogram is not completely included in any one of the third development areas and overflows the third development area (WC) 732. This means that "the clipping operation is clearly unnecessary" in the development processing of the parallelogram.

Figure 6:
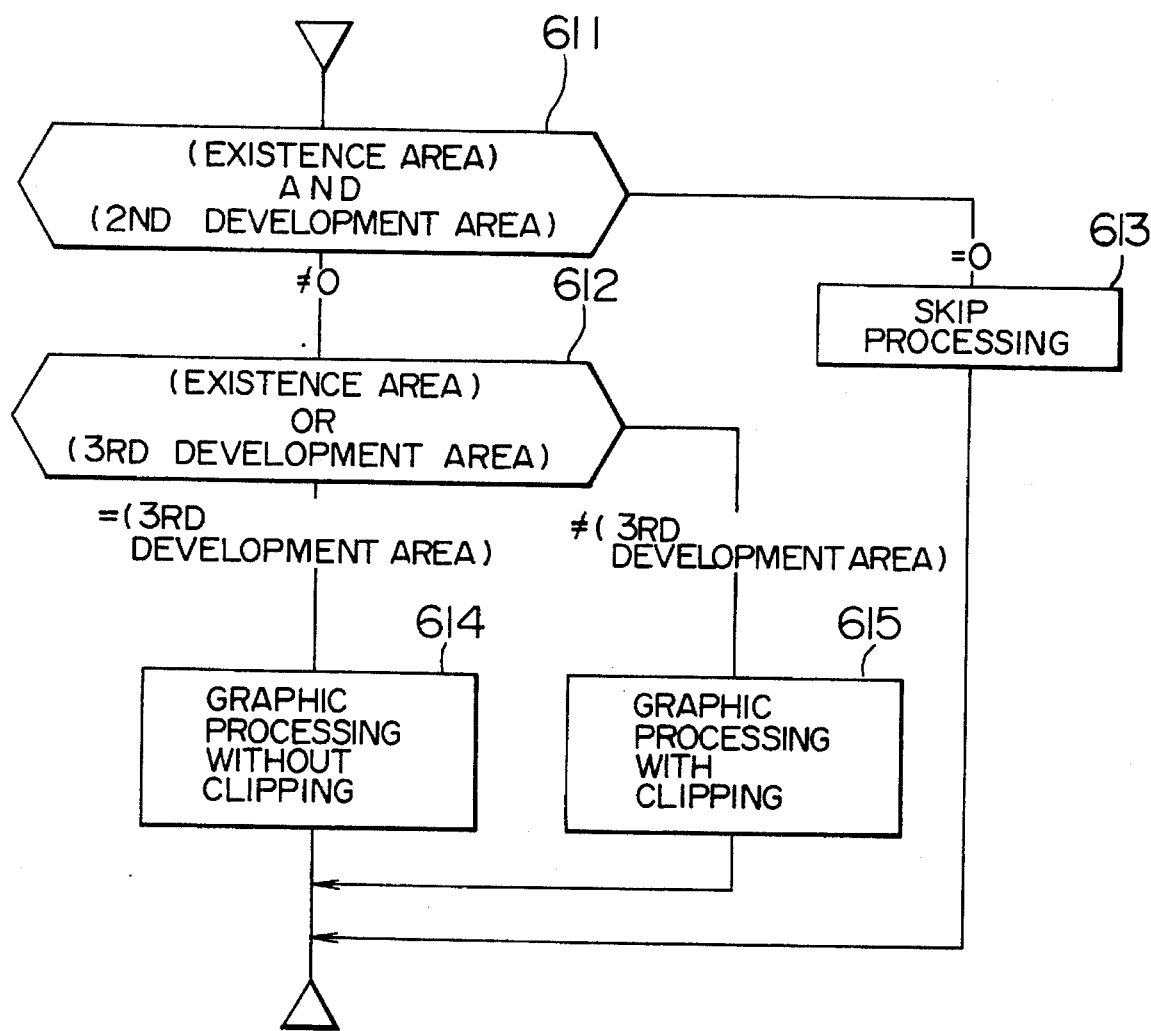
FIG. 6 is a general flowchart showing a comparison between an existence area and the second and third development areas.

FIG. 6 shows an outline of the processing flow referred to above. A description will be here given of the case of developing the parallelogram shown as a graphic image in association with FIGS. 3 to 5 into the first developing area 714. The existence area of the parallelogram in the world coordinate system is designated by (A10, B10)–(A11, B11), which indicates that the coordinate values of the x and y values of the lower-left corner and the x and y values of the upper-right corner are represented as A10, B10, A11, and B11, respectively. In the flowchart of FIG. 6, a step 611 achieves an area comparison between the existence area of the parallelogram and the second development area as follows.

(Existance area) = ((A10, B10) – (A11, B11) AND
AND (Second          ((X20, Y20) – (X21, Y21))
development area) = (Max(A10, X20), Max(B10, Y20)) –
                    (Min(A11, X21), Min(B11, Y21))

where, Max(A10, X20)<Min(A11, X21) and Max(B10, Y20)<Min(B11, Y21)

Zero where, Max(A10, X20)>Min(A11, X21) or Max(B10, Y20)>Min(B11, Y21)).

When these two areas do not overlap with each other, the ANDed area between the existence area and the second development area is zero and then control proceeds to the skip processing of a step 613. In the case of the objective parallelogram, there exists an overlapped portion, namely, the ANDed area between the two areas is reduced to (A10, Y20)–(A11, B11) A10<A11, Y20<B11.

This is other than zero and then control is passed to step 612.

In the processing step 612, the existence area is compared with the third development area as follows.

(Existance area) = ((A10, B10) – (A11, B11) OR
OR (Third          ((X30, Y30) – (X31, Y31))
development area) = (Min(A10, X30), Min(B10, Y30)) –
                    (Max(A11, X31), Max(B11, Y31))

If the existence area is here completely included in the third development area, namely, if the ORed area therebetween is in the third development area, control transfers to a step 614. Furthermore, if the existence area is not completely included in the third development area, namely, if the ORed area therebetween is outside the third development area, control is passed to a step 615. In the case of the parallelogram, (Existence area) OR (Third development area) =(A10, B10)–(X31, Y31)

Namely, the ORed result is not inside the third development area. In consequence, control proceeds to the graphic processing with the clipping operation (step 615).

In general, the graphic processing without the clipping operation can be accomplished at a higher speed as compared with the graphic processing which includes clipping. The method above-described enables the necessity of the clipping operation to be determined at a high speed, which considerably contributes to an increase of the graphic processing speed.

The area comparison processing steps are achieved by the graphics processor 3 of FIG. 1. The areas described above are kept in a first development area keep area 71, a second development area keep area 72, and a third development area keep area 73 of a local memory of the graphics processor 3.

FIG. 7 shows a development area map in the local memory of the graphics processor 3. The relationships of the mapped items are represented as follows in which an inverse coordinate transform matrix from the device coordinates to the world coordinates is assumed to be represented as M'.

$$\begin{bmatrix} X_{10} \\ Y_{10} \end{bmatrix} = M' \begin{bmatrix} x_{10} \\ y_{10} \end{bmatrix}, \begin{bmatrix} X_{11} \\ Y_{11} \end{bmatrix} = M' \begin{bmatrix} x_{11} \\ y_{11} \end{bmatrix} \quad (1)$$

$$\begin{bmatrix} X_{20} \\ Y_{20} \end{bmatrix} = M' \begin{bmatrix} x_{10} - d \\ y_{10} - d \end{bmatrix}, \begin{bmatrix} X_{21} \\ Y_{21} \end{bmatrix} = M' \begin{bmatrix} x_{11} + d \\ y_{11} + d \end{bmatrix} \quad (2)$$

$$\begin{bmatrix} X_{30} \\ Y_{30} \end{bmatrix} = M' \begin{bmatrix} x_{10} + d \\ y_{10} + d \end{bmatrix}, \begin{bmatrix} X_{31} \\ Y_{31} \end{bmatrix} = M' \begin{bmatrix} x_{11} - d \\ y_{11} - d \end{bmatrix} \quad (3)$$

The expressions (1) to (3) above take values depending only on $x_{10}$, $y_{10}$, $x_{11}$, and $y_{11}$ associated with the first development area (DC) and consequently need be computed only when the development area is changed.

Moreover, for discrimination of the graphic processing with or without clipping, a flag may be set so that the pertinent information is passed from the graphics processor 3 to the next rendering processor 4.

Figure 8:
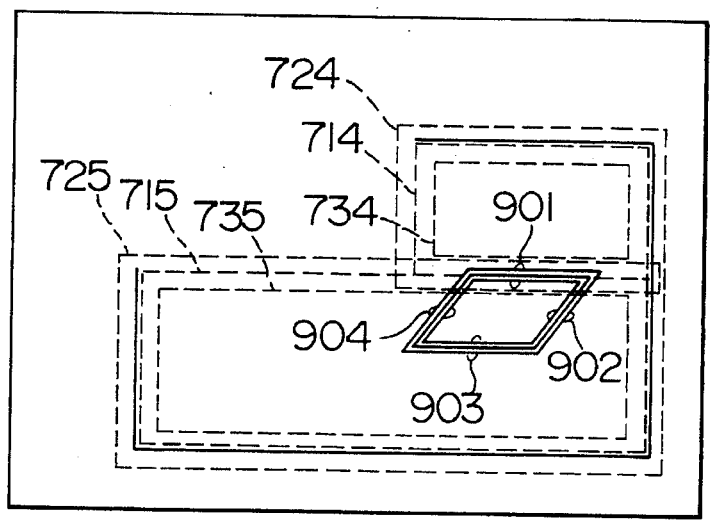
FIG. 8 is a diagram showing a clipping processing in the device coordinate system.
Figure 9:
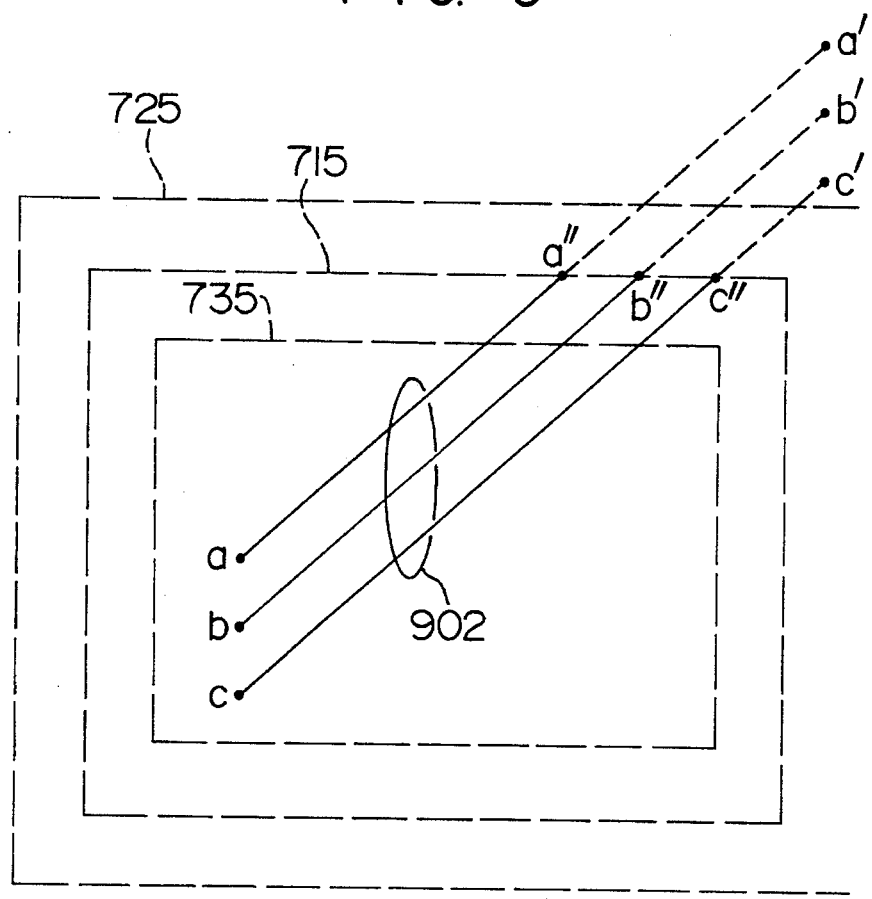
FIG. 9 is a diagram showing further in detail the clipping processing of FIG. 8.
Figure 10:
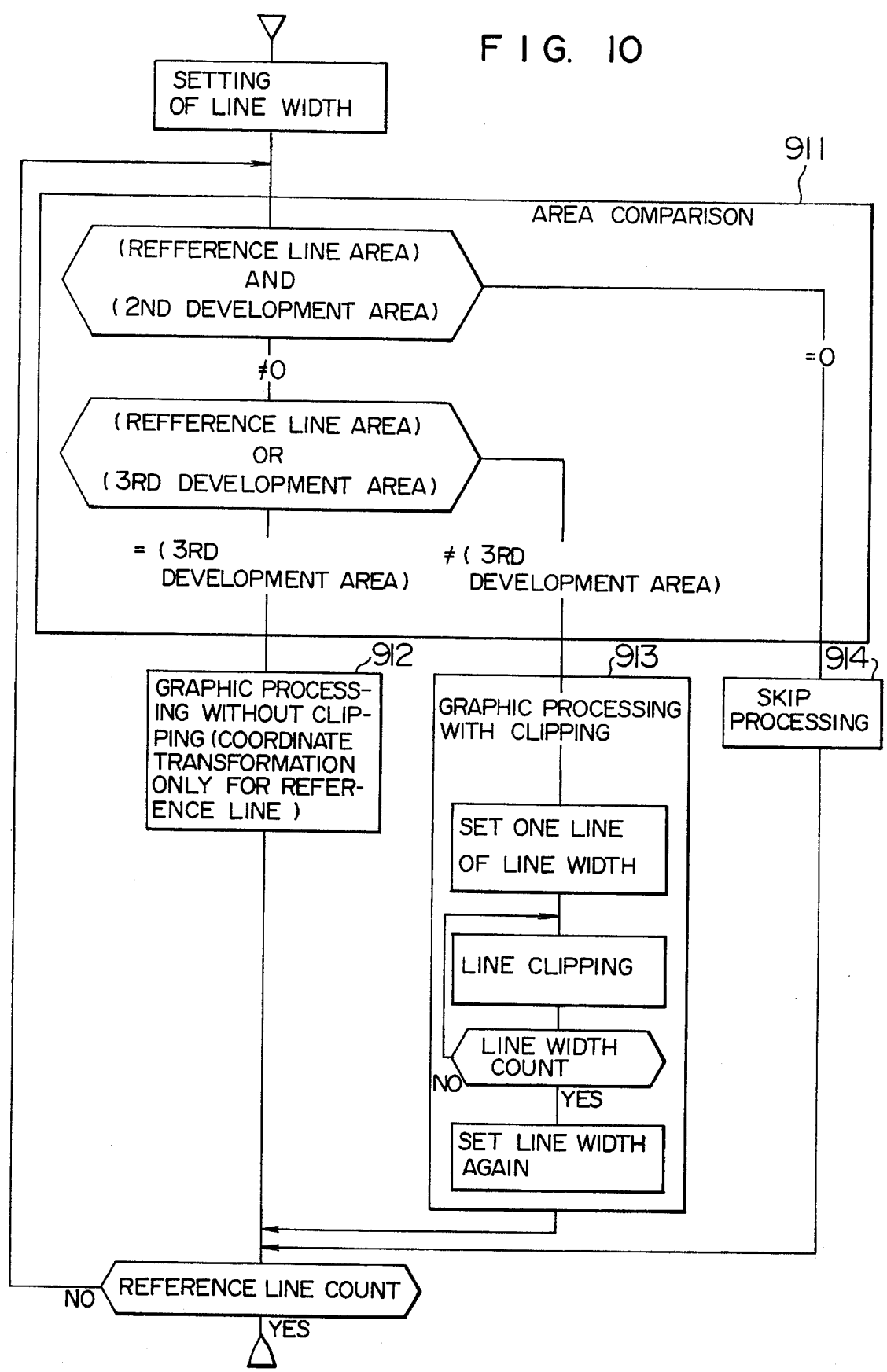
FIG. 10 is a general flowchart showing the clipping processing, of FIG. 8.

Referring next to FIGS. 8 to 10, a description will be given of the graphic processing with clipping shown in FIG. 6. FIG. 8 shows only the window 12 of FIG. 4B.

The rendering processor 4 serves in a direct line drawing operation to interpolate, based on the coordinate values of the start and end points supplied from the graphics processor 3, coordinate points between the start and end points. However, a line width as the attribute of the drawing operation is beforehand instructed with a command to the rendering processor 4. In consequence, when three lines are specified as the line width, the rendering processor 4 sequentially develops three lines for the start and end points specified by the line drawing command. Consequently, the clipping operation is achieved by the graphics processor 3.

The graphics processor 3 first instructs three lines as the line width attribute. Next, for each of four lines 901, 902, 903, and 904 constituting the parallelogram, the graphics processor 3 transforms coordinates of the first and end points (the first point for the starting line having a continuous line, whereas the end point for the continued line) into device coordinates so as to supply the rendering processor 4 with the coordinates in a vertex-by-vertex fashion. In this operation, as shown in a step 911 of FIG. 10, the necessity of the clipping processing is judged through an area comparison. Incidentally, the start and end points of a direct line indicate a development area of the line; consequently, the area associated with the start and end points of a direct line is compared with the respective development areas.

When the clipping operation is unnecessary, control transfers to a step 912, which passes the coordinate points directly to the rendering processor 4. For a line necessitating the clipping operation as in the case of a line 903 of FIG. 8, a step 913 is executed. In FIG. 8, lines 901, 902, and 904 are associated with this case.

In the step 913, first, one line is specified as a line width attribute to the rendering processor 4 so as to achieve the clipping operation and then the start and end points of each of three lines constituting the bold line are supplied to the rendering processor 4. As for the development area in the device coordinate system used in the clipping operation, a clipping point of a direct line is computed for the development area (WC) 71. Subsequently, three lines are again specified as the line width attribute to the rendering processor 4. FIG. 9 shows this processing. For example, the line 902 necessitates a computation of a clipping point. FIG. 9 illustratively shows this case. That is, for line segments a—a', b—b', and c—c' forming the line 902, the clipping points a", b", and c" are computed for the clipping operation in the first development area 715, so that an instruction containing a specification of line segments a—a", b—b", and c—c" is transmitted to the rendering processor 4.

Furthermore, if the image existence area is found to be clearly outside the development area as a result of the step 911, control transfers to the next line development processing.

In the embodiment referred to above, the existence area of the graphic image is compared with the second and third development areas. However, even if the area comparison is achieved only with either one of the second and third development areas, a remarkable effect is attainable to accomplish the development processing at a high speed.

Moreover, according to this embodiment, the second development area is compared with the existence area and then the third development area is compared therewith. However, by using a fact that the second development area is greater than the third development area in any case, it is possible to simultaneously compare the existence area with the second and third development areas.

In addition, in this embodiment, for three development areas, two sets of data items are respectively retained in the world and device coordinate systems, respectively. However, in a system in which the existence area of the objective graphic image is not contained in the display list, the development areas represented with the world coordinates are unnecessary. Also in such a system, with the configuration including only three development areas in the device coordinate system, the development processing can be carried out at a high speed.

Furthermore, in a system in which the existence area of the objective graphic image is not contained in the display list and the existence area is to be computed for each development processing and in a system in which the existence area contained in the display list is kept in accordance with the device coordinate system, another method is efficiently adopted. That is, the area comparison is not conducted by use of world coordinates. In this method, a first existence area of a minimum rectangle circumscribing a graphic image in the device coordinate system is somewhat enlarged to produce a second existence area such that the second existence area is compared with the first development area. This method will now be described by use of FIGS. 11 and 12. FIG. 11 shows graphic images in the device coordinate system. The system computes a second existence area 1111 of a parallelogram by expanding a circumscribing rectangle of the parallelogram by a fixed quantity d. The second existence area 1111 is compared with the first development areas (1114 and 1115 in FIG. 11) to determine at a high speed whether the skip processing and/or the clipping are/is required for the graphic processing of the objective graphic image.

Figure 12:
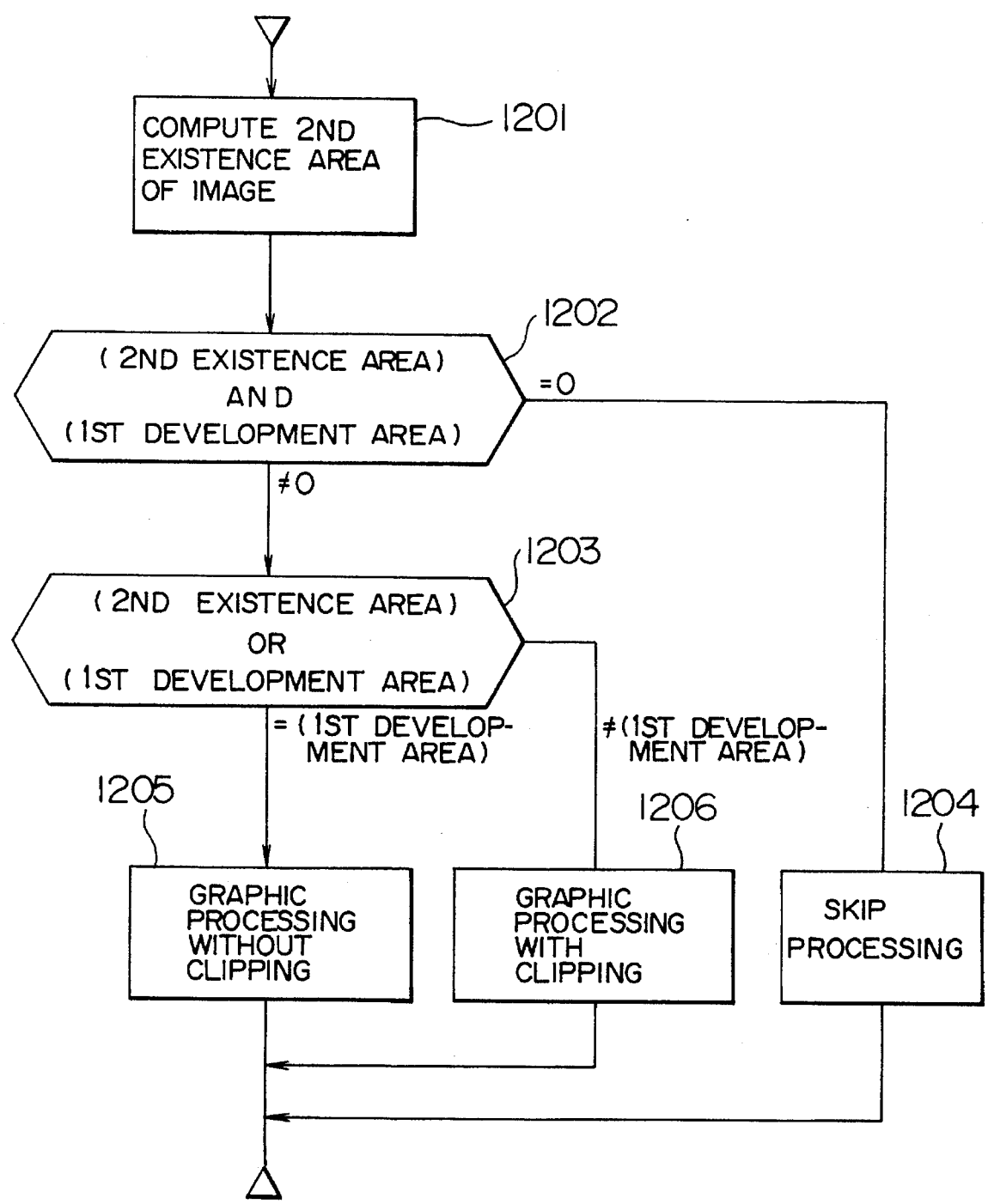
FIG. 12 is a general flowchart showing the comparison of FIG. 11.
Figure 13A:
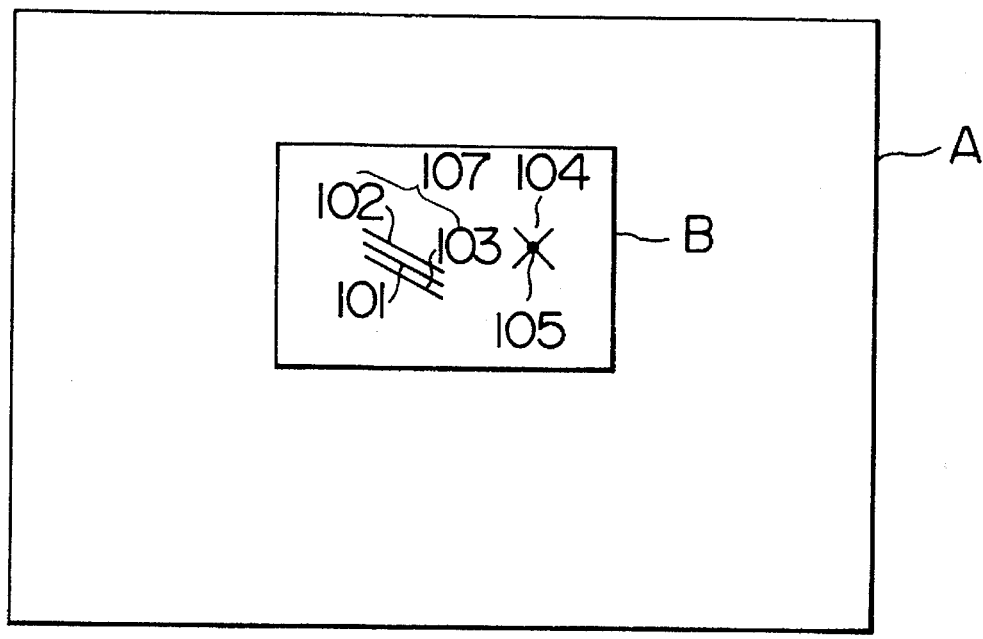
FIGS. 13A and 13B are diagrams for explaining an unnatural image display caused in association with a clipping operation.
Figure 13B:
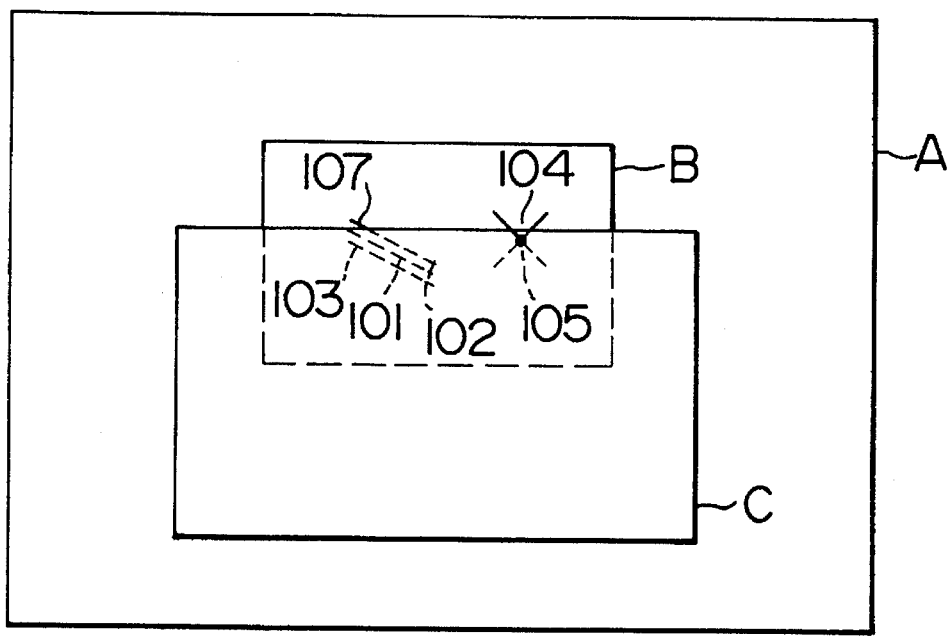

FIG. 12 shows a general flow of the processing above. First, a second existence area is computed for the graphic image (step 1201) as follows. Based on the maximum and minimum values (first existence area) employed to develop the image on the device coordinate system, in order to enlarge the area by d, the value d is added to the maximum value and the value d is reduced from the minimum values, thereby determining a second existence area.

The resultant second existence area is compared with the first development area (step 1202). When the ANDed area therebetween is zero, namely, these two areas are not overlapped with each other at all, the skip processing is achieved (step 1204). If overlapped and if an ORed area between the second existence area and the first development area results in the first development area, namely, when the second existence area is smaller than the first development area, the graphic processing is conducted without the clipping operation (step 1205). In other cases, the graphic processing is conducted with the clipping operation (step 1206).

Consequently, in the second embodiment, a kind of development area and a kind of image existence area are kept retained or are computed so as to determine the types of graphic processing.

According to the present invention, also for a graphic segment defined in two kinds of coordinate systems including the world and device coordinate systems, the necessity of the graphic processing can be decided before the graphic processing is actually attempted. In consequence, a high-speed graphic processing performance can be achieved.

Furthermore, in accordance with this embodiment, for a graphic segment necessitating the graphic processing or for a basic graphic segment constituting a graphic image, the necessity of the clipping operation can be determined prior to the graphic processing so as to achieve the graphic processing with or without the clipping operation in an appropriate manner, which enables the graphic processing to be executed at a high speed.

In the examples of these two embodiments, the rendering processor 4 possesses a function to develop all received commands in the frame memory. However, there may be a case where the rendering processor 4 is provided with a function (a mask function) to keep first development areas such that when developing a command supplied thereto, the rendering processor 4 develops in the frame memory only the segments found to be in the first development areas. Namely, other segments outside the first development areas are not developed in the frame memory. Next, a description will be given of an embodiment in a system employing a rendering processor of this type.

Figure 14:
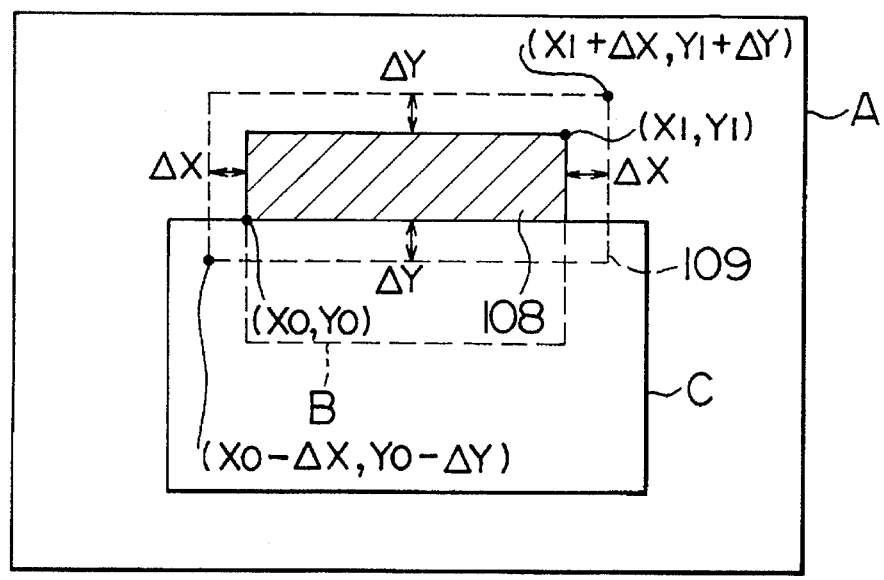
FIG. 14 is a diagram for explaining the principle of the clipping operation.

FIG. 14 is a diagram for explaining the principle of a third embodiment according to the present invention. For example, when a window C is opened over a window B opened in a screen A, a graphic region or area of the window B is determined to be a shade area 108. In a case where image data to be displayed in the area 108 is subjected to a window processing by use of a clipping method, according to this embodiment, the clipping is conducted first with an area (enclosed with broken lines in FIG. 14 and called a second development area 109 herebelow) which is generated by enlarging the graphic area 108 by ΔX and by ΔY in the x and y directions, thereby obtaining image data inside the second development area 109 (i.e. image data to be drawn). Of the image data judged to be inside the second development area 109, image data which is inside the second development area and which is beyond the graphic area 108 is processed so as to be inhibited in the display operation. As a result, it is possible to prevent an unnatural display of a display image and the like in a boundary region of the graphic area 108.

Figure 15:
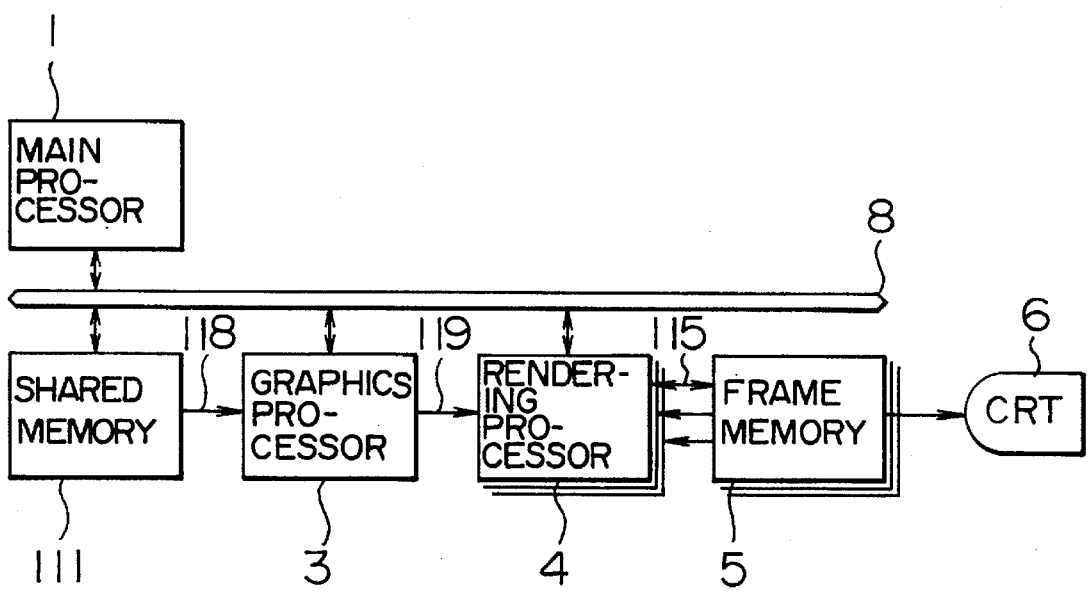
FIG. 15 is a schematic system configuration diagram showing a third embodiment in accordance with the present invention.

FIG. 15 is a configuration diagram of a portion associated with the graphics system in a workstation related to the third embodiment in accordance with the present invention. The graphics system associated with the third embodiment includes a main processor 1, a shared memory 111, a graphics processor 3, a plurality of rendering processors 4, and a bus 8 connecting these constituent components to each other, a plurality of frame memories 5 connected via a dedicated bus 115 to the rendering processor 4, a CRT for displaying information loaded in the frame memories 5, a dedicated bus 118 for connecting the shared memory 111 to the graphics processor 3, and a dedicated bus 119 for linking the graphics processor 3 with the rendering processor 4.

First, a description will be given of the fundamental operation of the graphic system thus constituted.

For example, when a direct line is to be displayed in a graphic or drawing area of a window opened in a screen, the main processor 1 writes in the shared memory 111 coordinates indicating a graphic area, a command to display a direct line, and coordinates $(x_i, y_1)$ and $(x_{i+1}, y_{i+1})$ of the end points of the line. Thereafter, the main processor 1 instructs via the bus 8 the graphics processor 3 to initiate an operation. By the way, the coordinates above are represented in the world coordinate system.

When the operation is initiated, the graphics processor 3 reads from the shared memory 111 the coordinates designating the graphic area, the command, and the coordinates of the end points so as to interpret the command to respectively transform the coordinates designating the graphic area and the coordinates of the end points into coordinates in the device coordinate system. Let us assume here that the lower-left corner and the upper-right corner of the resultant graphic area are expressed as $(X_0, Y_0)$ and $(X_1, Y_1)$, respectively and that the end points of the line thus attained are represented as $(X_i, Y_i)$ and $(X_{i+1}, Y_{i+1})$, respectively. Subsequently, the graphics processor 3 establishes a second development area for this graphic area to compare device coordinates designating the boundary of the second development area with the device coordinates representing the end points of the line. As a result, whether the direct line is inside or outside of the second development area is determined.

When the line is judged to be entirely inside the second development area, the coordinates of the end points are transferred via the dedicated bus 119 to the rendering processor 4. In a case where only a portion of the line is inside the second development area, the system obtains coordinates of an intersection between the line and the boundary line of the second development area to pass the attained coordinates and the coordinates of the end point of the line to the rendering processor 4. When the line is entirely outside the second development area, since this line need not be displayed, the processing is finished.

The rendering processor 4 develops pixels of the line between the end points based on the coordinates of the end points of the line passed from the graphics processor 3, thereby writing data in a memory cell of the frame memory 5 associated with the developed pixels. By the way, in this operation, the pixel data of the developed pixels outside the graphic area is not written in the frame memory 5, which will be described in detail later.

The pixel data written in the frame memory 5 as described above is displayed on the CRT 6, thereby displaying the direct line in the graphic area. In addition, when displaying a bold line, even if only the auxiliary lines of the bold line are inside the graphic area, since the line as the base of the operation is inside the second development area, pixel data of the auxiliary lines is written in the graphic area.

When displaying a marker in a graphic area, coordinates designating the graphic area, a marker display command, and coordinates of a center point of the marker are represented in the world coordinate system to be written in the shared memory 111. The graphics processor 3 interprets the command to transform the coordinates indicating the center point and the graphic area into coordinates in the device coordinate system. The graphics processor 3 then decides whether or not the center point of the marker is within the second development area. If this is the case, the converted coordinates are transmitted to the rendering processor 4. Using the coordinates of the center point thus received, the rendering processor 4 develops pixel data constituting the graphic image of the marker to store the resultant data in a memory cell of a frame memory 5 associated therewith. In this operation, of data of the developed pixels, pixel data outside the graphic area is not stored in the frame memory 5, which will be described in detail later.

The pixel data loaded in the frame memory 5 as described above is passed to the CRT 6, thereby displaying the marker in the graphic area of the window. Even in a case where the marker center is outside the graphic area, the center point is within the second development area. In consequence, the graphic image of the marker is formed such that for a portion thereof within the graphic area, pixel data is developed by the rendering processor 4 so as to be written in the frame memory 5. That is, only the portion of the marker image is displayed on the screen 6.

Figure 16:
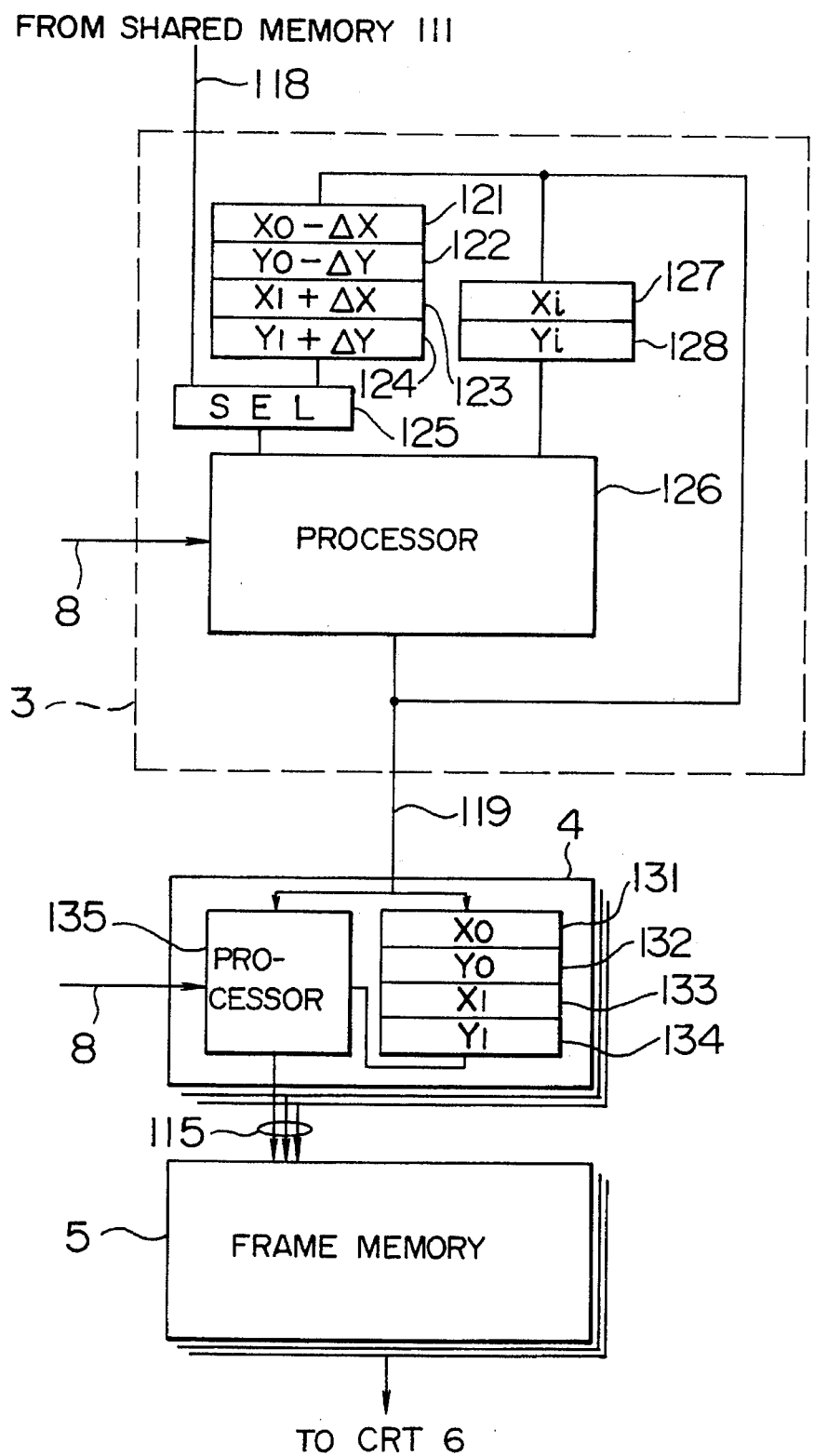
FIG. 16 is a diagram showing configurations of a graphics processor and a rendering processor in the system of FIG. 15.

FIG. 16 is a detailed configuration diagram of the graphics processor 3 and the rendering processor 4 of FIG. 15, which conduct the clipping method referred to above.

The graphics processor 3 comprises a group of registers 121 to 124, a group of registers 127 and 128, a selector 125 for selecting data supplied from the shared memory 111 via the dedicated bus 118 and data from the registers 121 to 124, and a processor 126.

The rendering processor 4 includes a processor 135 and boundary registers 131 to 134.

Figure 17:
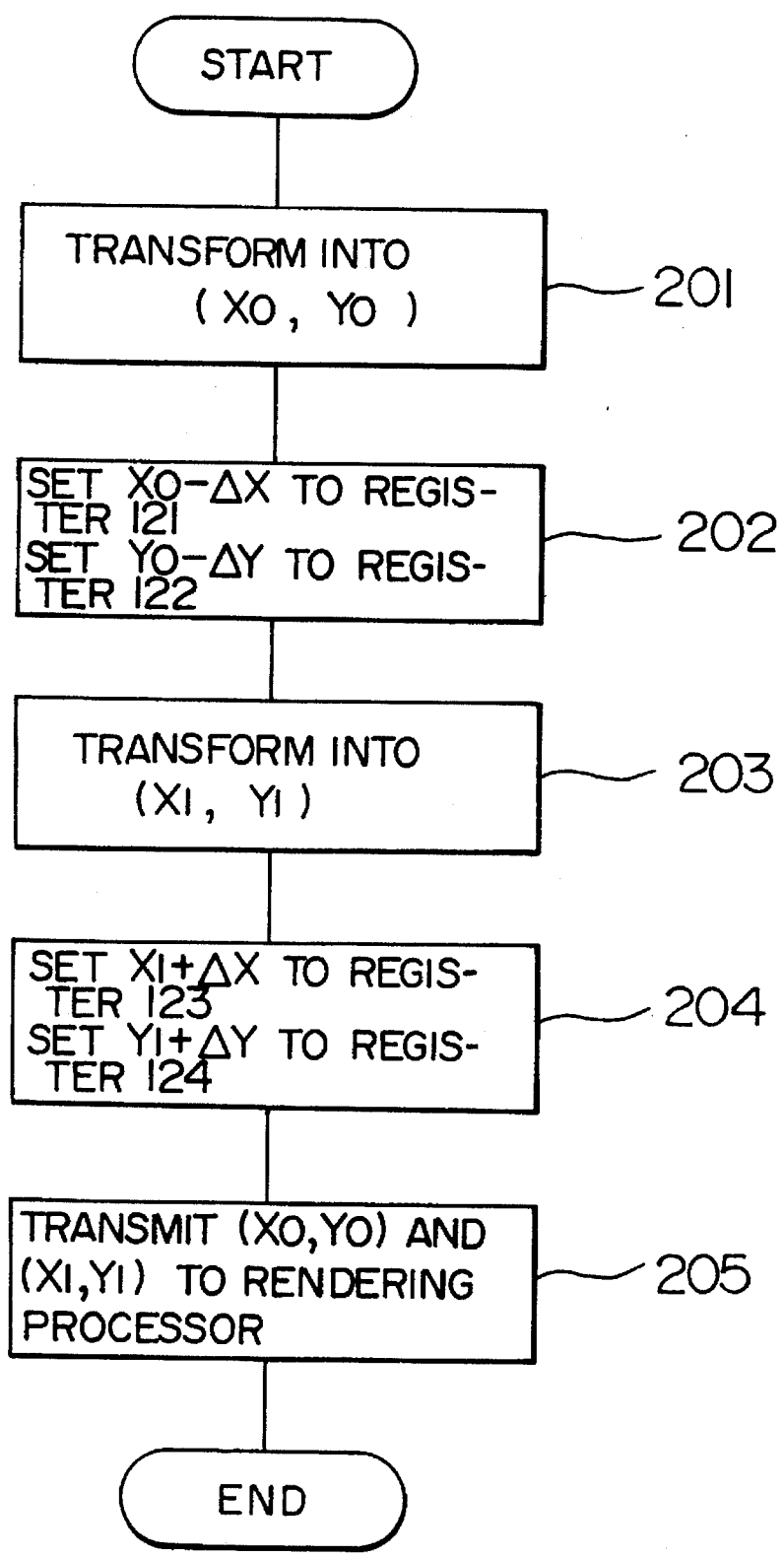
FIG. 17 a general flowchart showing a processing procedure of the graphics processor.

The processor 126 of the graphics processor 3 reads a command from the shared memory 111 to interpret the command. If the command is a graphic command associated with a window, the graphics processor 3 first reads world coordinates of the lower-left and upper-right corners of the graphic area via the selector 125 and then transforms the respective coordinates into device coordinates. Assume here the resultant coordinates to be $(X_0, Y_0)$ and $(X_1, Y_1)$, respectively (FIG. 14; steps 201 and 203 of FIG. 17). Subsequently, these coordinate values are sent to the rendering processor 4 (step 205) and $X_0-\Delta X$, $Y_0-\Delta Y$, $X_i+\Delta X$, and $Y_1+\Delta Y$ are computed (which stipulate the second development area). The computation results are then written in the respective registers 121 to 124 (steps 202 and 204). The flowchart of FIG. 17 shows the processing procedure employed in the processing above. By the way, the main processor 1 skips, when the graphic area is directly represented with device coordinate values $(X_0, Y_0)$ and $(X_1, Y_1)$ so as to be stored in the shared memory 111, the coordinate transform processing (steps 201 and 203) of these coordinate values.

When drawing a direct line, world coordinates of an end point thereof are read from the shared memory 111 so as to be transformed into associated device coordinates $(X_i, Y_i)$, which are written in the registers 127 and 128. A comparison is achieved between the data stored in the registers 127 and 128 and the data of the registers 121 to 124, thereby determining whether or not the end point represented by ($X_i$, $Y_i$) is within the second development area 109. If this is the case, the end point coordinates are passed to the rendering processor 4. Subsequently, coordinates of the other end of the line are read from the shared memory 111 to accomplish a similar processing. If the end point is outside the second development area 109, the system obtains an intersection between the second development area 109 and the line to be drawn to send the intersection coordinates to the rendering processor 4. When drawing a marker, coordinates of the center point of the marker are converted into device coordinates to store the results in the registers 127 and 128. It is determined whether or not the center point is inside the second development area 109. If this is the case, the coordinate values of the center point are transmitted to the rendering processor 4.

The rendering processor 4 loads the registers 131 to 134 with the coordinate values $X_0$, $Y_0$, $X_1$, and $Y_1$ which represent a graphic area and which are sent from the graphics processor 3. Moreover, when a drawing objective item is designated as a direct line, based on coordinates of both end points of the line or coordinates of an intersection and an end point, the system develops pixel data constituting a line linking the end points. When the drawing object is a marker, the system develops pixel data forming a graphic image of a marker on the pertinent center point. The addresses associated with the developed pixel data are compared with the values stored in the registers 131 to 134 so as to load the frame memory 5 only with the pixel data within the graphic area 108. The image data thus written in the frame memory 5 is displayed on the CRT 5, which forms a natural image display of an image on the boundary region of the graphic area 108. Namely, the operator does not perceive any unnatural feeling from the presented image.

The values of ΔX and ΔY determining the expansion range of the graphic area depends on the segment to be drawn. In the embodiment described above, the clipping has been accomplished in the device coordinate system. Describing the operation in this case, when the maximum size of the marker is assumed to be expressed as 23 by 23 pixels in the device coordinate system, the objective operation can be achieved by setting the values of ΔX and ΔY to half the values referred to above, namely, 12 pixels. In addition, also in a case of a bold line, the object of the processing can be attained by setting the values of ΔX and ΔY to half the values. Consequently, it may also be possible to beforehand establish the values of ΔX and ΔY based on a type or the like of the image to be drawn or there may be disposed means to which such values can be specified from an external device so that the values can be arbitrarily established depending on an instruction from the operator. By the way, when the clipping operation is to be carried out in an normalized device coordinate system, it is natural to employ values converted in association with the size in the normalized device coordinate system.

When the drawing operation is carried out for each pixel and the scrolling of the screen is achieved in the pixel unit, the display takes a long period of time and hence is onerous for the operator. In consequence, the display and scroll operations are accomplished in a unit of a plurality of pixels, for example, 16 or 32 pixels. In a case where the clipping method according to the present invention is applied to a graphics system employing the operation method referred to above, it is necessary that, for example, the 16-pixel data to be displayed in the proximity of the boundary of the graphic area is handled such that image data outside the graphic area is not to be displayed.

Figure 18:
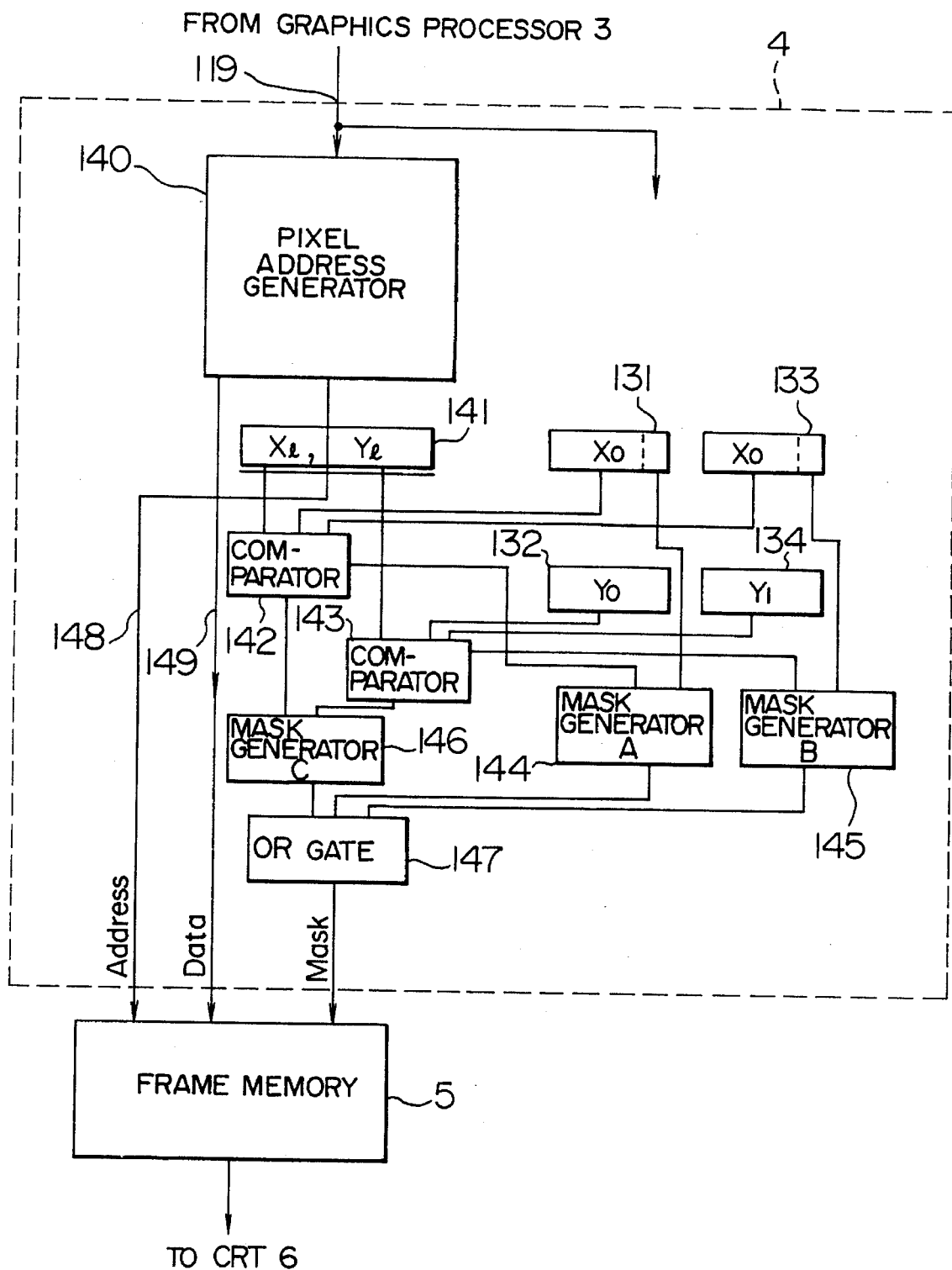
FIG. 18 is a diagram showing a configuration example of the revering processor.

FIG. 18 shows a detailed constitution diagram of the rendering processor 4 in a graphics system in which a memory access is carried out in the 16-pixel unit between the rendering processor 4 and the frame memories 5. The rendering processor 4 includes, in addition to the registers 131 to 134 for storing therein respective coordinate values $X_0$, $Y_0$, $X_1$, and $Y_1$, which represent a graphic area and which are sent from the graphics processor 3, a pixel address generator 140 for developing pixels of a display image in the 16-pixel unit and for generating an address of each 16-pixel unit, a register 141, comparators 142 and 143, mask generator circuits 144 to 146, and an OR circuit 147.

The image address generator 140 develops, based on information received from the graphic processor 3, the graphic image data into write data including rasters each comprising 16 pixels so as to send the obtained data to the frame memory 5. At the same time, for each unit of 16 pixels of the data, an address (Xl, Yl) is generated to be stored in the register 141. For example, the address is formed in a two-dimensional address represented with a ten-bit address Xl in the x-axis direction and a ten-bit address Yl in the y-axis direction. This address is also sent to the frame memory 5.

The comparator 142 compares the address Xl of the register 141 with the high-order bits respectively obtained by removing the low-order bits of the data stored in the boundary registers 131 and 133. Moreover, the comparator 143 compares the address Yl of the register 141 with the respective data in the boundary registers 131 and 133. As a result, whether or not the 16-pixel data is within the graphic area 108 is determined.

If this is the case, the mask generator circuits 144 and 145 output write signals to the OR circuit 147. Depending on a signal produced from the OR gate 147 in response to the write signals, the 16-pixel data supplied from the pixel address generator 140 to the frame memory 5 is written therein at a memory cell indicated by the address (Xl, Yl).

When the 16 pixels at the address (Xl, Yl) are found to be outside the graphic area 108, the mask generator circuit 146 delivers a write inhibit signal to the OR circuit 147, which then sends the write inhibit signal to the frame memory 5. As a result, the 16-pixel data created from the pixel address generator 140 is prevented from being written in the frame memory 5.

In a case where high-order bits produced by removing four low-order bits of the address Xl are identical to high-order bits attained by removing four low-order bits of the respective data items in the boundary registers 131 and 133, namely, when the 16 bits intersect the boundary line of the graphic area 108 and some pixels thereof are outside of the graphic area 108, a comparison result is supplied to the mask generator circuits 144 to 146. The mask generator 146 outputs a write signal to the OR circuit 147, whereas the mask generator circuit 144 or 145 sends a partial write inhibit signal to the OR circuit 147. For example, when the 16 pixels contain some pixels beyond the left-most end ($X_0$) of the graphic area 108, a partial write inhibit signal is delivered to the OR circuit 147 to mask the outside pixels based on the bit information of the four low-order bits associated with the 16 pixels. In response to the partial write inhibit signal supplied from the OR circuit 147 to the frame memory 5, the pixel data beyond the graphic area is prevented from being written in the frame memory 5.

Similarly, for the pixels beyond the right-most end ($X_1$) 109 of the graphic area 108, the mask generator circuit 145 produces a partial write inhibit signal. The similar processing is conducted also for the address Y1.

Figure 19:
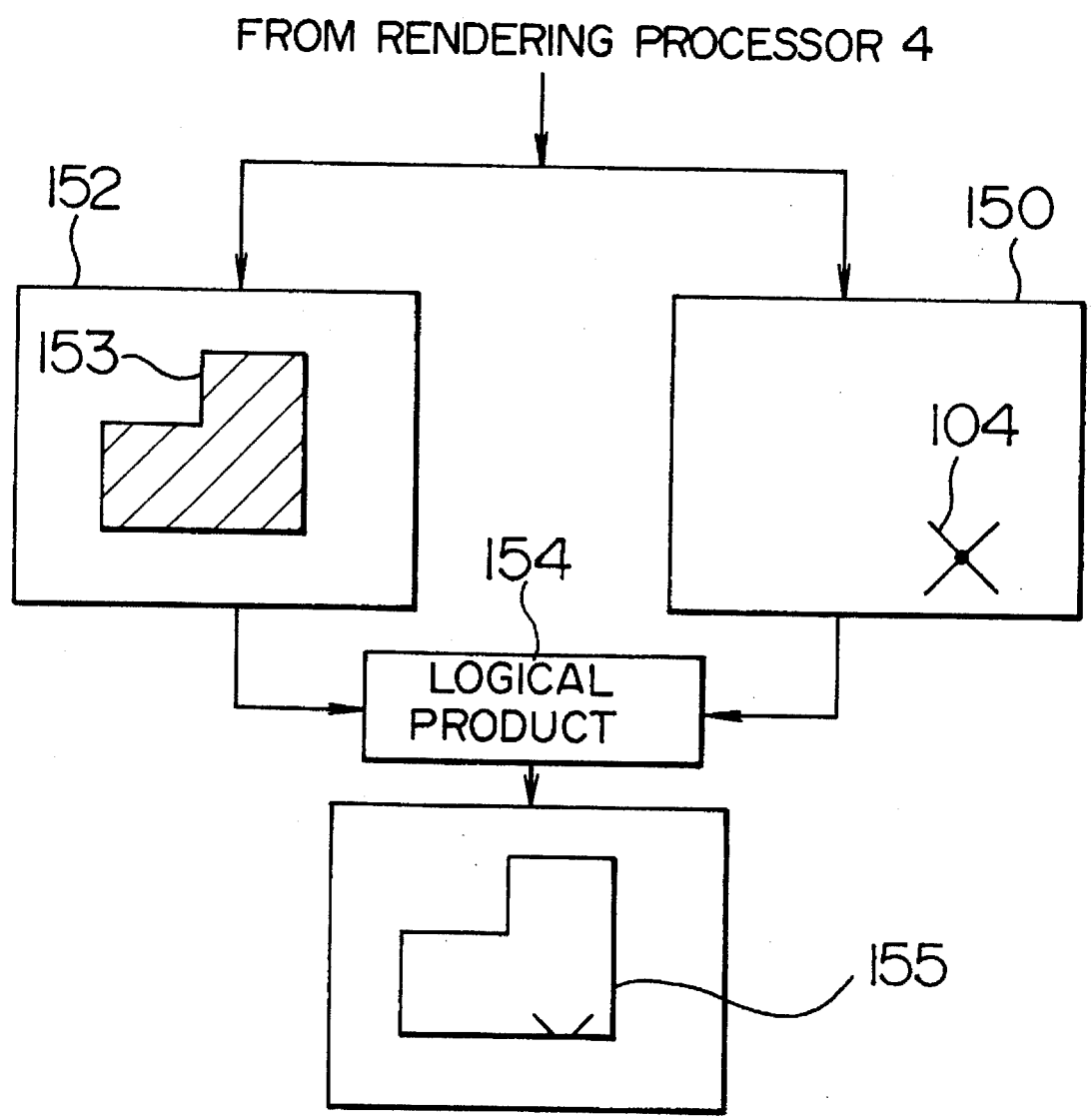
FIG. 19 is schematic diagram showing an example of an image data display inhibition in a clipping operation.

In the respective embodiments above, of the image data judged to be drawn in the second development area 109, image data constituting the actual graphic area is prevented from being written in the frame memory 5 so as not to be displayed on the screen. However, in addition to this method, the following method may be employed such that the image data outside the graphic area is prevented from being displayed. As shown in FIG. 19, it may also be possible to load a plane 150 of the frame memory 5 with all image data 151 developed by the rendering processor 4 such that in other plane 152, data of "1" is stored in a location (shade area) associated with the graphic area 153 and data of "0" is written in other location corresponding to the area other than the graphic area 153. When displaying data on the CRT, the data items respectively stored in the planes 150 and 152 are ANDed in an AND circuit 154, thereby preventing the write operation for the image data which is outside the graphic area and which is in the clipping area.

In accordance with the embodiment above, an unnatural display of the image is removed in the boundary region of the graphic area; furthermore, the image display processing can be achieved at a higher speed.

We claim:

1. A graphics processor comprising:

means for storing a plurality of sets of data, each including data for a graphic drawing command for a graphic image segment, in which positional information is defined in a world coordinate system and size information is defined in a device coordinate system in the graphic drawing command;

means for reading from said store means a set of data including a graphic drawing command;

means for computing an existence area circumscribing a graphic image segment said existence area being determined by the positional information in the data for the graphic drawing command;

means for computing a second development area by expanding a specified first development area for said graphic image segment by a predetermined quantity depending on the size information in the data of the graphic drawing command for the graphic image segment;

means for comparing the computed existence area with the computed second development area;

development specify means responsive to the computed existence area being not included to any extent in the second development area, for skipping a development of the graphic drawing command associated with the computed existence area into the first development area, and in other cases, for specifying the development of the graphic drawing command; and means connected to said development specify means for outputting data to effect development, in a bit map configuration, of the graphic image segment specified by the graphic drawing command being developed.

2. A graphics processor according to claim 1, further including means for computing a third development area for said graphic image segment by reducing the first development area by a predetermined quantity depending on the size information in the data in the graphic drawing command for the graphic image segment, wherein said compare means compares, for a graphic drawing command to be developed, the computed existence area with the computed third development area, and said development specify means is responsive to the computed existence area being completely included in the computed third development area, for judging a clipping operation to be unnecessary for the graphic drawing command the graphic image segment associated with the computed existence area so as to specify a development of the graphic drawing command without clipping information, and in other cases, for specifying the development of the graphic drawing command to include clipping information.

3. A graphics processor according to claim 2, further including rendering means, coupled to said developing means, for conducting a mask processing, based on received clipping information, for a portion of the graphic image segment to be removed by the clipping operation.

4. A graphics processor according to claim 2 further including frame memory means connected to said rendering means, wherein said frame memory means comprises:

a first memory plane for storing therein first pixel data developed in the bit map configuration;

a second memory plane for storing therein second pixel data indicating the first development area; and logic means for achieving a logic operation on the first and second pixel data.

5. A graphics processor comprising:

means for storing a plurality of sets of data, each including data for a graphic drawing command for a graphic image segment, in which positional information is defined in a world coordinate system and size information is defined in a device coordinate system in the graphic drawing command;

means for reading from said store means a set of data including a graphic drawing command;

means for computing an existence area circumscribing a graphic image segment said existence area being determined by the positional information in the data for the graphic drawing command;

means for computing a second development area for said graphic image segment by reducing a specified first development area for said graphic image segment by a predetermined quantity depending on the size information in the data of the graphic drawing command for the graphic image segment;

means for comparing the computed existence area with the computed second development area;

development specify means responsive to the computed existence area being completely included in the computed second development area, for judging that a clipping operation is unnecessary for the graphic drawing command for the graphic image segment associated with the computed existence area so as to specify a development of the graphic drawing command without clipping information, and in other cases, specifying the development of the graphic drawing command to include clipping information; and means connected to said development specify means for outputting data to effect development, in a bit map configuration, of the graphic image segment specified by the graphic drawing command being developed.

6. A graphics processor according to claim 5, further including rendering. means, coupled to said developing means, for conducting a mask processing, based on received clipping information, for a portion of the graphic image segment to be removed by the clipping operation.

7. A graphics processor according to claim 5 further including frame memory means connected to said rendering means, wherein said frame memory means comprises:

a first memory plane for storing therein first pixel data developed in the bit map configuration;

a second memory plane for storing therein second pixel data indicating the first development area; and logic means for achieving a logic operation on the first and second pixel data.

8. A graphics processor comprising:

means for storing a plurality of sets of data, each including data for a graphic drawing command for a graphic image segment, in which positional information is defined in a world coordinate system and size information is defined in a device coordinate system graphic drawing command;

means for reading from said store means a set of data including a graphic drawing command;

means for computing a second existence area by expanding a specified first existence area circumscribing a graphic image segment, said second existence area being determined by the positional information in the data for the graphic drawing command by a predetermined quantity depending on the size information in the data for the graphic drawing command;

means for comparing the computed second existence area with a specified development area of the graphic image segment;

development specify means responsive to the second existence area being not included in the specified development area, for skipping a development of the graphic drawing command associated with the computed second existence area into the specified development area, responsive to the computed second existence area being completely included in the specified development area, for judging that a clipping operation is unnecessary for the development of the graphic drawing command associated with the computed second existence area so as to specify a development of the graphic drawing command without clipping information, and in other cases, for specifying the development of the graphic drawing command to include clipping information; and means connected to said development specify means for outputting data to effect development, in a bit map configuration the graphic image segment specified by the graphic drawing command being developed.

9. A graphics processor according to claim 8, further including rendering means, coupled to said developing means, for conducting a mask processing, based on received clipping information, for a portion of the graphic image segment to be removed by the clipping operation.

10. A graphics processor according to claim 8 further including frame memory means connected to said rendering means, wherein said frame memory means comprises:

a first memory plane for storing therein first pixel data developed in the bit map configuration;

a second memory plane for storing therein second pixel data indicating the first development area; and logic means for achieving a logic operation on the first and second pixel data.

11. A graphiics system, comprising:

means for storing a plurality of sets of data, each including data for a graphic drawing command for a graphic image segment, in which positional information is defined in a world coordinate system and size information is defined in a device coordinate system in the graphic drawing command;

a central processing unit for specifying a graphic drawing command stored in said store means so as to generate an initiation signal; and a graphics processor unit, the operation of which is initiated by receipt of the initiation signal from said central processing unit;

said graphics processor unit including:

means for reading out from said store means a set of data including a graphic drawing command;

means for computing an existence area circumscribing a graphic image segment, said existence area being determined by the positional information in the data for the graphic drawing command;

means for computing a second development area by expanding a specified first development area for said graphic image segment by a predetermined quantity depending on the size information in the data in the graphic drawing command for the graphic image segment;

means for comparing the computed existence area with the computed second development area; and development specify means responsive to the computed existence area being not included to any extent in the second development area, for skipping a development of the graphic drawing command associated with the computed existence area into the first development area, and in other cases, for specifying the development of the graphic drawing command;

a rendering processor connected to said graphics processor unit for developing in a bit map configuration a graphic image segment for a graphic drawing command specified for development by said development specify means;

a frame memory connected to said rendering processor for storing therein pixel data developed in the bit map configuration; and display equipment connected to said frame memory for displaying the pixel data in a graphic area associated with the first development area.

12. A graphics system, comprising:

means for storing a plurality of sets of data, each including data for a graphic drawing command for a graphic image segment, in which positional information is defined in a world coordinate system and size information is defined in a device coordinate system in the graphic drawing command;

a central processing unit for specifying a graphic drawing command stored in said store means so as to generate an initiation signal; and a graphics processor unit, the operation of which is initiated by receipt of the initiation signal from said central processing unit;

said graphics processor unit including:

means for reading out from said store means a set of data including a graphic drawing command;

means for computing an existence area circumscribing a graphic image segment, said existence area being determined by the positional information in the data for the graphic drawing command;

means for computing a second development area by reducing a specified first development area for said graphic image segment by a predetermined quantity depending on the size information in the data for the graphic drawing command;

means for comparing the computed existence area with the computed second development area;

development specify means responsive to the computed existence area being completely included in the computed second development area, for judging that a clipping operation is unnecessary for the graphic drawing command for the graphic image segment associated with the computed existence area so as to specify a development area of the graphic drawing command without clipping information, and in other cases, specifying the development of the graphic drawing command to include clipping information;

a rendering processor connected to said graphics processor unit for developing in a bit map configuration a graphic image segment for a graphic drawing command specified for development by said development specify means;

a frame memory connected to said rendering processor for storing therein pixel data developed in the bit map configuration; and display equipment connected to said frame memory for displaying said pixel data in a graphic area associated with the first development area.

13. A graphics system, comprising:

means for storing a plurality of sets of data, each including data for a graphic drawing command for a graphic image segment, in which positional information is defined in a world coordinate system and size information is defined in a device coordinate system in the graphic drawing command;

a central processingunit for specifying a graphic drawing command stored in said store means so as to generate an initiation signal; and a graphics processor unit, the operation of which is initiated by receipt of the initiation signal from said central processing unit;

said graphics processor unit including:

means for reading out from said store means a set of data including a graphic drawing command;

means for computing a second existence area by expanding a specified first existence areal circumscribing a graphic image segment, said second existence area being determined by the positional information in the data for the graphic drawing command by a predetermined quantity depending on the size information in the data for the graphic drawing command;

means for comparing the computed second existence area with a specified development area of the graphic image segment;

development specify means responsive to the second existence area being not included in the development area, for skipping a development of the graphic drawing command associated with the computed second existence area into the specified development area, responsive to the second existence area being completely included in the specified development area, for judging that a clipping operation is unnecessary in the development of the graphic drawing command associated with the computed second existence so as to specify a development of the graphic drawing command without clipping information, and in other cases, for specifying the development of the graphic drawing command to include clipping information;

a rendering processor connected to said graphics processor unit for developing in a bit map configuration a graphic image segment for a graphic drawing command specified for development by said development specify means;

a frame memory connected to said rendering processor for storing therein pixel data developed in the bit map configuration; and display equipment connected to said frame memory for displaying the pixel data in a graphic area associated with the development area.

14. A graphics processing method comprising the steps of:

storing in store means a plurality of sets of data, each including data for a graphic image command for a graphic image segment, in which positional information is defined in a world coordinate system and size information is defined in a device coordinate system in the graphic drawing command;

reading from the store means a set of data including a graphic drawing command;

computing an existence area circumscribing a graphic image segment, said existence area being determined by the positional information in the data for the graphic drawing command;

computing a second development area by expanding a specified first development area of said graphic image segment by a predetermined quantity depending on the size information in the data for the graphic drawing command;

comparing the computed existence area with the computed second development area such that when the computed existence area is not included in the second development area, a development of the graphic drawing command into the first development area is skipped, and in other cases, the development of the graphic drawing command is specified; and developing the graphic drawing command to provide, in a bit map configuration, the graphic image segment.

15. A graphics processing method according to claim 14 further including a step of computing a third development area by reducing the first development area for said graphic image segment by a predetermined quantity depending on the size information in the data for the graphic drawing command, wherein said comparison step compares, for a graphic drawing command to be developed, the computed existence area with the computed third development area; and when the computed existence area is completely included in the computed third development area, a clipping operation is judged to be unnecessary for the development of the graphic drawing command so as to specify a development of the graphic drawing command without clipping information, and in other cases, the development of the graphic drawing command including clipping information is specified.

16. A graphics processing method comprising the steps of:

storing in store means a plurality of sets of data, each including data for a graphic drawing command for a graphic image segment, in which positional information is defined in a world coordinate system and size information is defined in a device coordinate system in the graphic drawing command;

reading from said store means a set of data including a graphic drawing command;

computing an existence area circumscribing a graphic image segment, said existence area being determined by the positional information in the data for the graphic drawing command;

computing a second development area by reducing a specified first development area for said graphic image segment by a predetermined quantity depending on the size information in the data for the graphic drawing command;

comparing the computed existence area with the computed second development area;

when the computed existence area is completely included in the computed second development area, a clipping operation is judged to be unnecessary for the graphic drawing command and a development of the graphic drawing command without clipping information is carried out, and in other cases, the development of the graphic drawing command with clipping information is specified; and developing the graphic drawing command to provide, in a bit map configuration, the graphic image segment.

17. A graphics processing method comprising the steps of:

storing in store means a plurality of sets of data, each including data for a graphic drawing command for a graphic image segment, in which positional information is defined in a world coordinate system and size information is defined in a device coordinate system in the graphic drawing command;

reading from said store means a set of data including a graphic drawing command;

computing a second existence area by expanding a specified first existence area circumscribing a graphic image segment, said second existence area being determined by the positional information in the data for the graphic drawing command by a predetermined quantity depending on the size information in the data for the graphic drawing command;

comparing the computed second existence area with a specified development area;

when the computed second existence area is not included in the specified development area, a development of the graphic drawing command associated with the computed existence area into the specified development area is skipped, when the computed second existence area is completely included in the specified development area, a clipping operation is judged to be unnecessary for the development of the graphic drawing command associated with the computed second existence area so as to specify a development of the graphic drawing command without clipping information, and in other cases, the development of the graphic drawing command with clipping information is specified; and developing the graphic drawing command to provide, in a bit map configuration, the graphic image segment.

* * * * *